US 9,420,050 B1

(12) United States Patent
Sakata et al.

(10) Patent No.: US 9,420,050 B1
(45) Date of Patent: Aug. 16, 2016

(54) LOG REPORTING FOR A FEDERATED PLATFORM

(75) Inventors: Jayson G. Sakata, Encino, CA (US); Alexander A. Kazerani, Santa Monica, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 880 days.

(21) Appl. No.: 13/223,001

(22) Filed: Aug. 31, 2011

Related U.S. Application Data

(60) Provisional application No. 61/524,294, filed on Aug. 16, 2011.

(51) Int. Cl.
*G06F 15/16* (2006.01)
*H04L 29/08* (2006.01)
*H04L 29/06* (2006.01)

(52) U.S. Cl.
CPC ............... *H04L 67/22* (2013.01); *H04L 65/80* (2013.01)

(58) Field of Classification Search
CPC ............ G06F 17/30864; G06F 17/30545; G06F 17/30566; G06F 9/542; G06F 21/10; G06F 17/30035; H04L 63/1408; H04L 67/10; H04L 67/306; H04L 63/10; H04L 65/4084; H04L 65/80; H04L 47/783; H04L 67/22
USPC ................. 709/206, 205, 217–219, 224–226
See application file for complete search history.

(56) References Cited

U.S. PATENT DOCUMENTS

| | | | |
|---|---|---|---|
| 5,943,656 A * | 8/1999 | Crooks et al. .................. | 705/30 |
| 6,405,252 B1 | 6/2002 | Gupta et al. | |
| 6,442,551 B1 | 8/2002 | Ofek | |
| 6,502,125 B1 | 12/2002 | Kenner et al. | |
| 6,591,266 B1 | 7/2003 | Li et al. | |
| 6,795,868 B1 | 9/2004 | Dingman et al. | |
| 6,799,221 B1 | 9/2004 | Kenner et al. | |
| 6,975,963 B2 * | 12/2005 | Hamilton et al. .............. | 702/182 |
| 7,010,578 B1 | 3/2006 | Lewin et al. | |
| 7,035,925 B1 * | 4/2006 | Nareddy et al. .............. | 709/224 |
| 7,111,057 B1 | 9/2006 | Sherman et al. | |
| 7,185,052 B2 | 2/2007 | Day | |
| 7,340,505 B2 | 3/2008 | Lisiecki et al. | |
| 7,376,727 B2 * | 5/2008 | Weller et al. ................. | 709/223 |

(Continued)

FOREIGN PATENT DOCUMENTS

WO     WO0142990 A2 *   6/2001     .......... H04L 67/1002

*Primary Examiner* — Ruolei Zong
(74) *Attorney, Agent, or Firm* — Los Angeles Patent Group; Arman Katiraei

(57) ABSTRACT

Some embodiments provide a log reporting system for a federation of independently operated CDNs so that logs, performance, analytics, and billing can be obtained for customers irrespective of which servers of which federation participants the customers' configurations are deployed to. The system includes a log aggregator, splitter, management agent, archival storage, dissemination agent, data log analyzer, and portal. The log aggregator aggregates server logs from servers of the federation participants. The splitter produces customer logs by regrouping the server logs on a per customer basis irrespective of which servers of which federation participants produced entries for each customer. The management agent controls operations of the archival storage, dissemination agent, and log analyzer. The archival storage archives customer logs. The dissemination agent disseminates customer logs. The log analyzer processes the customer logs to produce reports, analytics, and billing. The portal is an interface to access the customer logs.

23 Claims, 26 Drawing Sheets

(56) References Cited

U.S. PATENT DOCUMENTS

| | | | |
|---|---|---|---|
| 7,376,730 B2* | 5/2008 | Pandya | 709/224 |
| 7,441,045 B2 | 10/2008 | Skene et al. | |
| 7,554,930 B2 | 6/2009 | Gaddis et al. | |
| 7,657,622 B1 | 2/2010 | Douglis et al. | |
| 7,660,896 B1 | 2/2010 | Davis et al. | |
| 7,822,871 B2 | 10/2010 | Stolorz et al. | |
| 7,827,183 B2* | 11/2010 | Fraser et al. | 707/748 |
| 7,840,667 B2* | 11/2010 | Weller et al. | 709/224 |
| 7,860,964 B2 | 12/2010 | Brady et al. | |
| 8,073,777 B2* | 12/2011 | Barry et al. | 705/50 |
| 8,117,306 B1 | 2/2012 | Baumback et al. | |
| 2002/0078233 A1 | 6/2002 | Biliris et al. | |
| 2002/0116444 A1 | 8/2002 | Chaudhri et al. | |
| 2003/0093523 A1 | 5/2003 | Cranor et al. | |
| 2003/0149581 A1* | 8/2003 | Chaudhri | G06Q 30/0601 709/203 |
| 2003/0229682 A1 | 12/2003 | Day | |
| 2004/0054596 A1* | 3/2004 | Meinhardt | 705/26 |
| 2004/0172466 A1 | 9/2004 | Douglas et al. | |
| 2007/0168517 A1 | 7/2007 | Weller et al. | |
| 2007/0174442 A1 | 7/2007 | Sherman et al. | |
| 2007/0250560 A1 | 10/2007 | Wein et al. | |
| 2008/0133531 A1* | 6/2008 | Baskerville et al. | 707/9 |
| 2009/0055506 A1 | 2/2009 | Hudson et al. | |
| 2009/0089625 A1* | 4/2009 | Kannappan et al. | 714/39 |
| 2009/0172167 A1 | 7/2009 | Drai et al. | |
| 2010/0010905 A1* | 1/2010 | Arzumanyan et al. | 705/21 |
| 2010/0070603 A1* | 3/2010 | Moss | H04L 67/289 709/207 |
| 2010/0235494 A1* | 9/2010 | Sood et al. | 709/224 |
| 2011/0029668 A1 | 2/2011 | Menai | |
| 2011/0060812 A1 | 3/2011 | Middleton | |
| 2011/0078230 A1 | 3/2011 | Sepulveda | |
| 2011/0082785 A1* | 4/2011 | Weller | G06Q 40/04 705/37 |
| 2011/0131341 A1 | 6/2011 | Yoo et al. | |
| 2011/0258342 A1* | 10/2011 | Gagliardi et al. | 709/241 |
| 2013/0006949 A1* | 1/2013 | Essawi et al. | 707/703 |

* cited by examiner

LOG REPORTING FOR A FEDERATED PLATFORM

CLAIM OF BENEFIT TO RELATED APPLICATIONS

This application claims the benefit of U.S. provisional application 61/524,294, entitled "Open Content Delivery Network Platform with Capacity Exchange", filed Aug. 16, 2011. The contents of Provisional Application 61/524,294 are hereby incorporated by reference.

TECHNICAL FIELD

The present invention relates to content delivery networks (CDNs) and more specifically, to log reporting in a federated platform of multiple CDNs.

BACKGROUND ART

Content delivery networks (CDNs) have greatly improved the way content is transferred across data networks such as the Internet. A CDN accelerates the delivery of content by reducing the distance that content travels in order to reach a destination. To do so, the CDN strategically locates surrogate origin servers, also referred to as caching servers or edge servers, at various points-of-presence (POPs) that are geographically proximate to large numbers of content consumers and the CDN utilizes a traffic management system to route requests for content hosted by the CDN to the edge server that can optimally deliver the requested content to the content consumer. Determination of the optimal edge server may be based on geographic proximity to the content consumer as well as other factors such as load, capacity, and responsiveness of the edge servers. The optimal edge server delivers the requested content to the content consumer in a manner that is more efficient than when origin servers of the content publisher deliver the requested content. For example, a CDN may locate edge servers in Los Angeles, Dallas, and New York. These edge servers may cache content that is published by a particular content publisher with an origin server in Miami. When a content consumer in San Francisco submits a request for the published content, the CDN will deliver the content from the Los Angeles edge server on behalf of the content publisher as opposed to the much greater distance that would be required when delivering the content from the origin server in Miami. In this manner, the CDN reduces the latency, jitter, and amount of buffering that is experienced by the content consumer. The CDN also allows the content publisher to offload infrastructure, configuration, and maintenance costs while still having the ability to rapidly scale resources as needed. Content publishers can therefore devote more time to the creation of content and less time to the creation of an infrastructure that delivers the created content to the content consumers.

As a result of these and other benefits, many different CDNs are in operation today. Edgecast, Akamai, Limelight, and CDNetworks are some examples of operating CDNs that are responsible for the delivery of terabytes worth of content. FIG. 1 illustrates a representative infrastructure for some such CDNs. As shown in FIG. 1, the infrastructure includes a distributed set of edge servers 110, traffic management servers 120, and an administrative server 130. The figure also illustrates the interactions that CDN customers including content publishers have with the CDN and interactions that content consumers or end users have with the CDN.

Each edge server of the set of edge servers 110 may represent a single physical machine or a cluster of machines. The cluster of machines may include a server farm for a geographically proximate set of physically separate machines or a set of virtual machines that execute over partitioned sets of resources of one or more physically separate machines. The set of edge servers 110 are distributed across different edge regions of the Internet to facilitate the "last mile" delivery of content. The edge servers run various processes that (1) manage what content is cached, (2) how content is cached, (3) how content is retrieved from the origin server when the content is not present in cache, (4) monitor server capacity (e.g., available processor cycles, available memory, available storage, etc.), (5) monitor network performance (e.g., latency, downed links, etc.), and (6) report statistical data on the delivered content. The set of edge servers 110 may provide the monitoring information to the traffic management servers 120 to facilitate the routing of content consumers to the optimal edge servers. The set of edge servers 110 may provide the statistical data to the administrative server 130 where the data is aggregated and processed to produce performance reports for the delivery of the customers' content.

The traffic management servers 120 route content consumers, and more specifically, content consumer issued requests for content to the one or more edge servers. Different CDN implementations utilize different traffic management schemes to achieve such routing to the optimal edge servers. Consequently, the traffic management servers 120 can include different combinations of Doman Name System (DNS) servers, load balancers, and routers performing Anycast or Border Gateway Protocol (BGP) routing. For example, some CDNs utilize the traffic management servers 120 to provide a two-tiered DNS routing scheme, wherein the first DNS tier resolves a DNS request to the CDN region (or POP) that is closest to the requesting content consumer and the second DNS tier resolves the DNS request to the optimal edge server in the closest CDN region. As another example, some CDNs use Anycast routing to identify the optimal edge server.

The administrative server 130 may include a central server of the CDN or a distributed set of interoperating servers that perform the configuration control and reporting functionality of the CDN. The reporting functionality may include deriving performance reports, analytics, billing data, and raw data for customers of the CDN based on server logs that are aggregated from the set of edge servers 110 that record detailed transactions performed by each of the servers 110.

Existing log reporting functionality includes proprietary systems and methods that have been developed independently by the CDNs or that include third party systems that have been customized for specific CDNs. Typically, the software and hardware for these systems and methods are incompatible, thus creating a barrier to CDN federation.

CDN federation is advocated by EdgeCast Networks Inc. of Santa Monica, Calif. as a means for providing dynamic CDN scalability, providing a larger global CDN footprint, and increasing utilization of a CDN operator's capacity by making some or all of that capacity available to multiple CDN service providers who then, in turn, can realize advantages of a CDN without the need to develop the optimized software and without the need to deploy the infrastructure necessary to operate a CDN. The Open CDN platform conceived by Edge-Cast Networks Inc. is a federation of independently operated CDNs. The CDNs participating in the federation can exchange capacity with one another such that CDNs with excess capacity can avoid the sunk costs associated with capacity going unused by selling that capacity to CDNs that are in need of additional capacity. The capacity sold by a CDN seller can then be configured and used for purposes of a CDN buyer.

However, the incompatible proprietary or customized log reporting systems and methods of each independently operated CDN is a barrier to such a federation and the advantages that can be realized from such a federation. Specifically, the incompatibility prevents the accurate and comprehensive reporting for a customer configuration that (1) is offloaded from a native CDN, or the CDN to which the customer belongs, to a foreign CDN or (2) is simultaneously deployed to capacity of two different CDNs. This is because the native CDN that reports to the customer does not have access to the logs produced by the servers of the foreign CDN to which the customer's configuration was deployed. Furthermore, even if the native CDN had access to the logs of the foreign CDN, the logs may include proprietary identifiers and may be formatted differently than those identifiers and formats used by the native CDN. The customer therefore has no easily available means of ascertaining how his/her configuration is performing in the federation. The simple solution of having the customer decipher logs from disparate reporting systems of different CDNs is unacceptable. Furthermore, there is no obvious solution for integrating logs from different CDNs as the participants in the federation can change over time, the pair of CDNs that exchange logs can change with each customer configuration deployed across the federation, and each CDN may have its own proprietary or customized set of reporting software and hardware.

Accordingly, there is a need to provide enhanced log reporting systems and methods that are able to provide logs and performance reports, statistical data, and billing information derived from the logs for a customer that has its configuration deployed across a federations of CDNs. To do so, there is a need for the log reporting systems and methods to aggregate logs from the independently operated participants of the federation. There is further a need to process the aggregated logs in order to accurately and comprehensively convey the performance of any particular customer configuration irrespective of which server resources of which federation participants that particular customer configuration is deployed to. There is also a need to provide log reporting systems and methods that are scalable to support the sizeable amount of raw data that is reported within the logs aggregated from each of multiple federation participants as a reporting system for a single CDN participant may aggregate and process over a billion lines of logs every hour.

SUMMARY OF THE INVENTION

It is an object of the embodiments described herein to provide detailed log reporting and derived usage and functionality for a federation of multiple content delivery networks (CDNs) participating in the federation. More specifically, it is an object to provide log reporting and derived usage and functionality for a customer configuration irrespective of which servers of which federation participants the customer configuration is deployed to.

To achieve these and other objects, some embodiments provide log reporting systems and methods for a federation of multiple independently operated CDNs that intercommunicate with one another, wherein intercommunication includes the sharing of capacity between CDNs. In some embodiments, the federation participants include CDN operators, CDN services providers, and other cloud or distributed platform operators or service providers.

Some embodiments provide a log reporting system that includes one or more of a log aggregator, data store, splitter, management agent, archival storage, dissemination agent, log analyzer, and portal. In some embodiments, the log aggregator aggregates server logs from the servers of the different federation participants. The aggregated server logs are stored to the data store. The splitter accesses the data store to regroup the transactional entries of the server logs on a per customer basis irrespective of which servers of which federation participants produced the transactional entries each customer. The management agent is a rules engine specifying rules that determine what operations the archival storage, dissemination agent, and log analyzer are to perform on the grouped customer logs. The archival storage, dissemination agent, and log analyzer periodically query the management agent. In some embodiments, the management agent specifies rules for the archival storage to store customer logs and optionally other processed data for some customers so that those customers can subsequently retrieve the logs and data as needed. In some embodiments, the management agent specifies rules for the dissemination agent to automatically disseminate customer logs or other processed data to some customers when the logs and data become available. In some embodiments, the management agent specifies rules for the log analyzer to process the customer logs for some customers for purposes of (1) producing performance reports and analytics to represent the performance realized for configurations of those customers across the federation, (2) producing billing data that the federation participants can use to charge customers, and (3) producing billing data that one federation participant can use to charge another federation participant. The portal is an interface with which customers and federation participants can access the customer logs and data derived from the processing of the customer logs (e.g., performance reports, analytics, billing, etc.).

Different frameworks may be used to integrate the log reporting system in different federations. In some embodiments, the log reporting system is integrated to directly aggregate the server logs from the servers of the federation participants. In some other embodiments, the log reporting system is integrated to communicably couple with the existing reporting systems of the federation participants. In this integration framework, the log reporting system may aggregate all of the server logs from the federation participants or aggregate some of the server logs that include transactional entries for customer configurations that have been deployed to at least one foreign federation participant. In some embodiments, the log reporting system produces the performance reports, analytics, and billing data for the foreign deployed customer configuration. In some embodiments, the log reporting system acts as an intermediary that redistributes the transactional entries for customer configurations that have been deployed to at least one foreign federation participant back to the native federation participant for that customer configuration. In some embodiments, the log reporting system is integrated with each federation participant so that the corresponding functionality is performed in a distributed manner.

BRIEF DESCRIPTION OF THE DRAWINGS

In order to achieve a better understanding of the nature of the present invention, a preferred embodiment for the Open CDN platform and log reporting system will now be described, by way of example only, with reference to the accompanying drawings in which.

DETAILED DESCRIPTION

Figure 1:
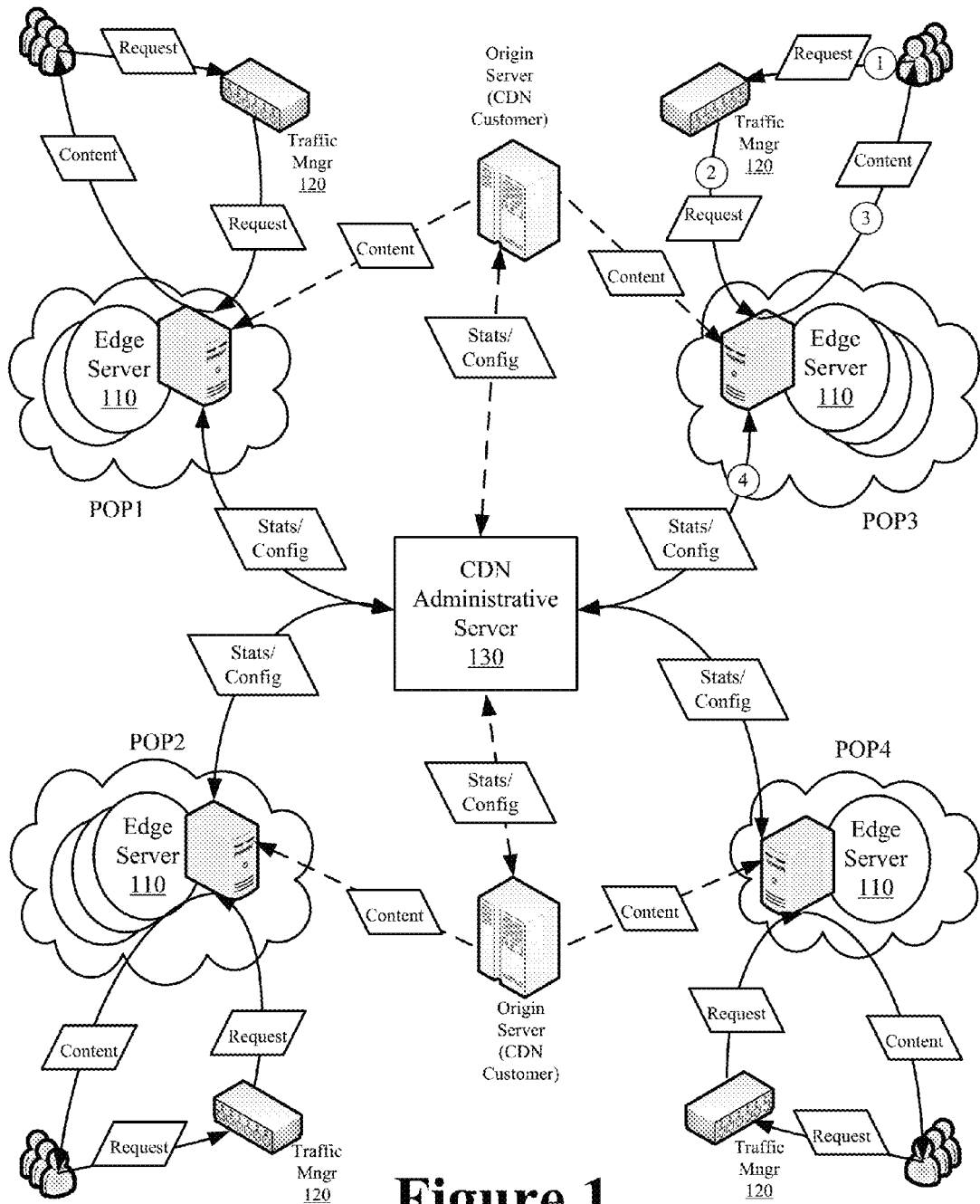
FIG. 1 illustrates a representative infrastructure for some CDNs.

In the following detailed description, numerous details, examples, and embodiments of an Open CDN platform and a log reporting system for the Open CDN platform are set forth and described. As one skilled in the art would understand in light of the present description, the Open CDN platform and log reporting system are not limited to the embodiments set forth, and the Open CDN platform and log reporting system may be practiced without some of the specific details and examples discussed. Also, reference is made to the accompanying figures, which illustrate specific embodiments in which the invention can be practiced. It is to be understood that other embodiments can be used and structural changes can be made without departing from the scope of the embodiments herein described.

To aid in the discussion below, the term Open CDN participant (OCDNP) is defined to include any network CDN operator, any service provider, any provider of hosting, caching, or cloud services, and any operator of a distributed set of servers that participate in the Open CDN platform by either providing capacity to the other participants or by utilizing capacity of another participant. Some OCDNPs envisioned to participate in the capacity exchange include content delivery networks (CDNs) such as Edgecast, Akamai, Limelight, CDNetworks, and Mirror Image. Other OCDNPs that can participate in the capacity exchange include Amazon CloudFront, Amazon EC2, AT&T, and Web.com. Also, the terms native and foreign are used. Native refers to the host OCDNP for a customer. In other words, the customer is registered with the native OCDNP and directly receives service from the native OCDNP. As will be described in further detail below, the native OCDNP can offload some or all of the customer's configuration or services to a non-host OCDNP or foreign OCDNP. The foreign OCDNP services the customer on behalf of the native OCDNP in a manner that is seamless and transparent to the customer of the native OCDNP.

I. Capacity Exchange

Some embodiments provide a CDN capacity exchange whereby capacity from different OCDNPs can be bought, sold, and traded. As used herein, capacity refers to the ability of a particular OCDNP to deliver content on behalf of a content originator or content publisher. Capacity is determined from the availability of disparate resources and disparate service attributes related to those resources. Resources that comprise a construct or measure of capacity include processor cycles, memory, bandwidth, throughput, and services (e.g., caching of static content, caching of dynamic content, application services, media streaming, secure content delivery, etc.). Service attributes qualify the application of capacity. These service attributes may include identifying a geographic region that the capacity covers, identifying the time of day that the capacity is available, identifying the duration for the availability of capacity, and identifying the one or more points of presence (POPs) or edge servers that provide the capacity as some examples. A geographic region represents any definable area such as a continent, country, state, city, zipcode, municipality, and any other contiguous or noncontiguous area of arbitrary size. The geographic region may be used to represent (1) the geographic region that is "covered" by the capacity, (2) a commercial region associated with a set of pricing/economic terms, or (3) a combination of (1) and (2) as defined by the OCDNP seller of the service instance.

In the Open CDN platform, each addressable unit of capacity that OCDNPs exchange in the capacity exchange is referred to as a "service instance". A service instance may be represented by a CNAME, but is ultimately resolved to an Internet protocol (IP) address or a virtual IP (VIP) address. A service instance can be granularly defined to comprise capacity of a single server, a cluster of servers, one or more POPs, a geographic region, or a regional Anycast VIP address as some examples. In instances where a service instance is defined using capacity of multiple servers, the address for the service instance (e.g., hostname, IP, and VIP) may be directed to a load balancer or other traffic management service that autonomously manages traffic allocation across the servers of the service instance.

In some embodiments, the Open CDN platform has certain defined and/or required service attributes that all service instances use to ensure consistent interpretation by OCDNPs (i.e., the capacity exchange buyers and sellers). The preferred embodiment is designed to serve as an extensible framework such that future functions not yet implemented can be added to the Open CDN platform in a flexible way without disrupting pre-existing functionality. Some service attributes may be defined as required, reserved, system, optional, or multi-value. Required means that the service attribute must be specified for all service instances. Reserved means that the service attribute has a defined meaning by the Open CDN platform. System means that the value of the service attribute is supplied by the Open CDN platform or the OCDNP. Optional means that the service attribute need not have a value and is informational in nature. Multi-value means that there may be more than one name-value pair with the same name associated with the service instance. In addition, OCDNPs may be able to provide "private" service attributes which serve as metadata for informational, tracking, categorization, or other purposes not directly anticipated by the preferred embodiment. As should be evident based on the foregoing, capacity is a construct or measure that can be defined differently based on the different sets of resources and service attributes that are associated with the construct or measure of capacity.

The capacity exchange is part of an "Open CDN" platform in which any OCDNP participating in the capacity exchange can (1) dynamically scale its capacity, (2) expand the reach of its CDN into previously untapped geographic regions without physically establishing POPs at those geographic regions, and (3) reduce sunk costs associated with unused capacity of already deployed infrastructure by selling that unused capacity to other OCDNPs that are in need of additional capacity. Specifically, the capacity exchange is a marketplace for OCDNPs to make their unused capacity available for other OCDNPs to purchase, configure, and use.

Figure 2:
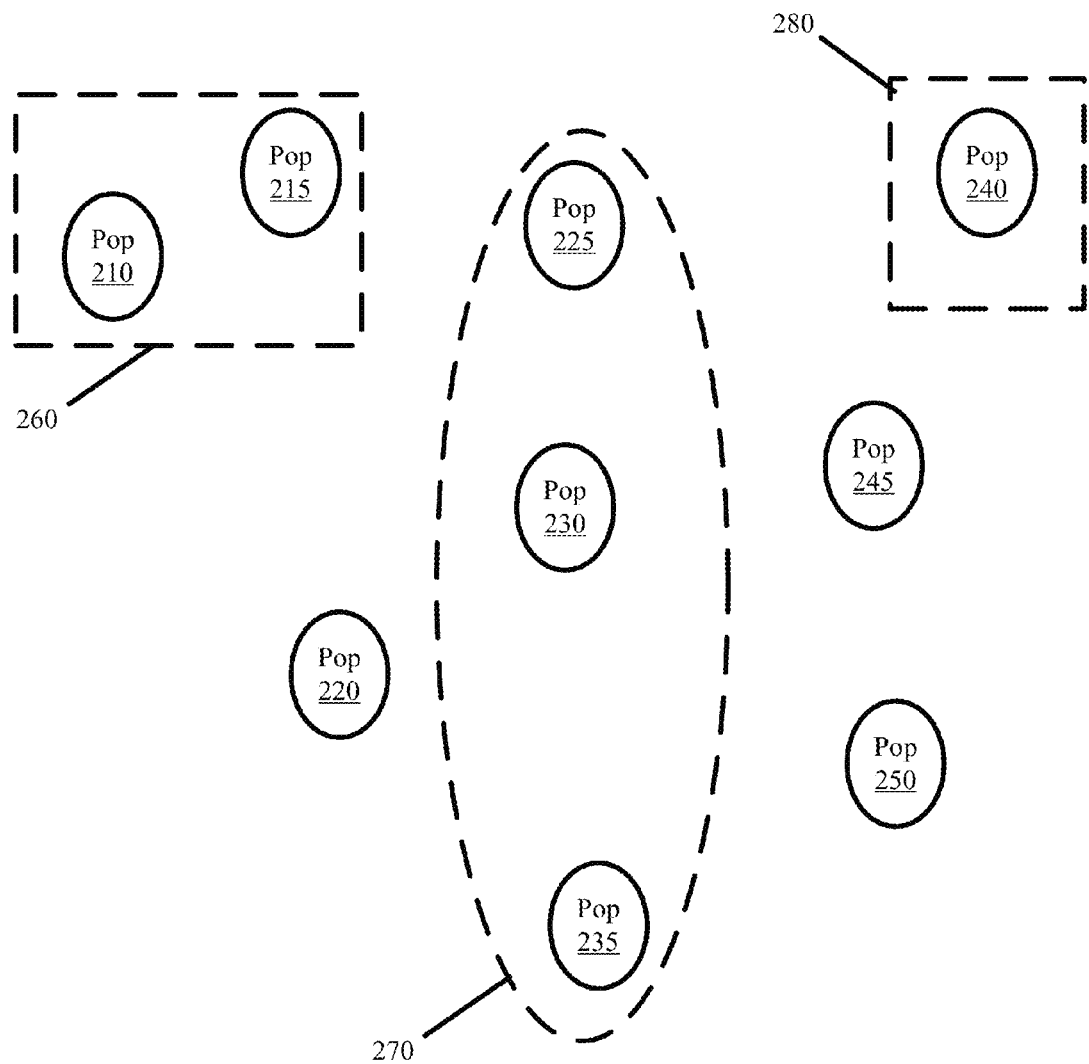
FIG. 2 conceptually illustrates defining different service instances that can be bought, sold, or exchanged in the capacity exchange of the Open CDN platform in accordance with some embodiments.

FIG. 2 conceptually illustrates defining different service instances that can be bought, sold, or exchanged in the capacity exchange of the Open CDN platform in accordance with some embodiments. FIG. 2 illustrates geographically distributed POPs 210, 215, 220, 225, 230, 235, 240, 245, and 250 of a particular OCDNP and different service instances 260, 270, and 280 that are defined based on the available capacity at some of the POPs. Specifically, service instance 260 is defined with available capacity at POPs 210 and 215; service instance 270 is defined with available capacity at POPs 225, 230, and 235; and service instance 280 is defined with available capacity at POP 240. It should be apparent be apparent that a service instance can be defined with more or less granularity. For example, a service instance can be defined with available capacity at one or more specific edge servers within one or more POPs or a service instance can be defined with available capacity at an entire geographic region that is serviced by multiple POPs.

Each service instance made available to the capacity exchange is uniquely identified with a service instance identifier (OCDN_SIID). The OCDN_SIID can be a multi-digit hexadecimal value. In some embodiments, the OCDN_SIID is formatted as OCDN_SIID=OCDN_SPID:SIID wherein the OCDN_SPID is a unique identifier assigned to each OCDNP participant in the Open CDN platform and the SIID is a number that is assigned by the OCDNP offering the service instance, wherein the SIID uniquely identifies the service instance within the OCDNP or within the Open CDN platform.

In some embodiments, the service instance may be assigned any variable number of service attributes. The service attributes comprise name value pairs that describe metadata about the service instance. Service attributes refine the application of capacity and can be used as searchable fields for aligning the qualifications of potential buyers of capacity with the appropriate service instance(s).

Figure 3:
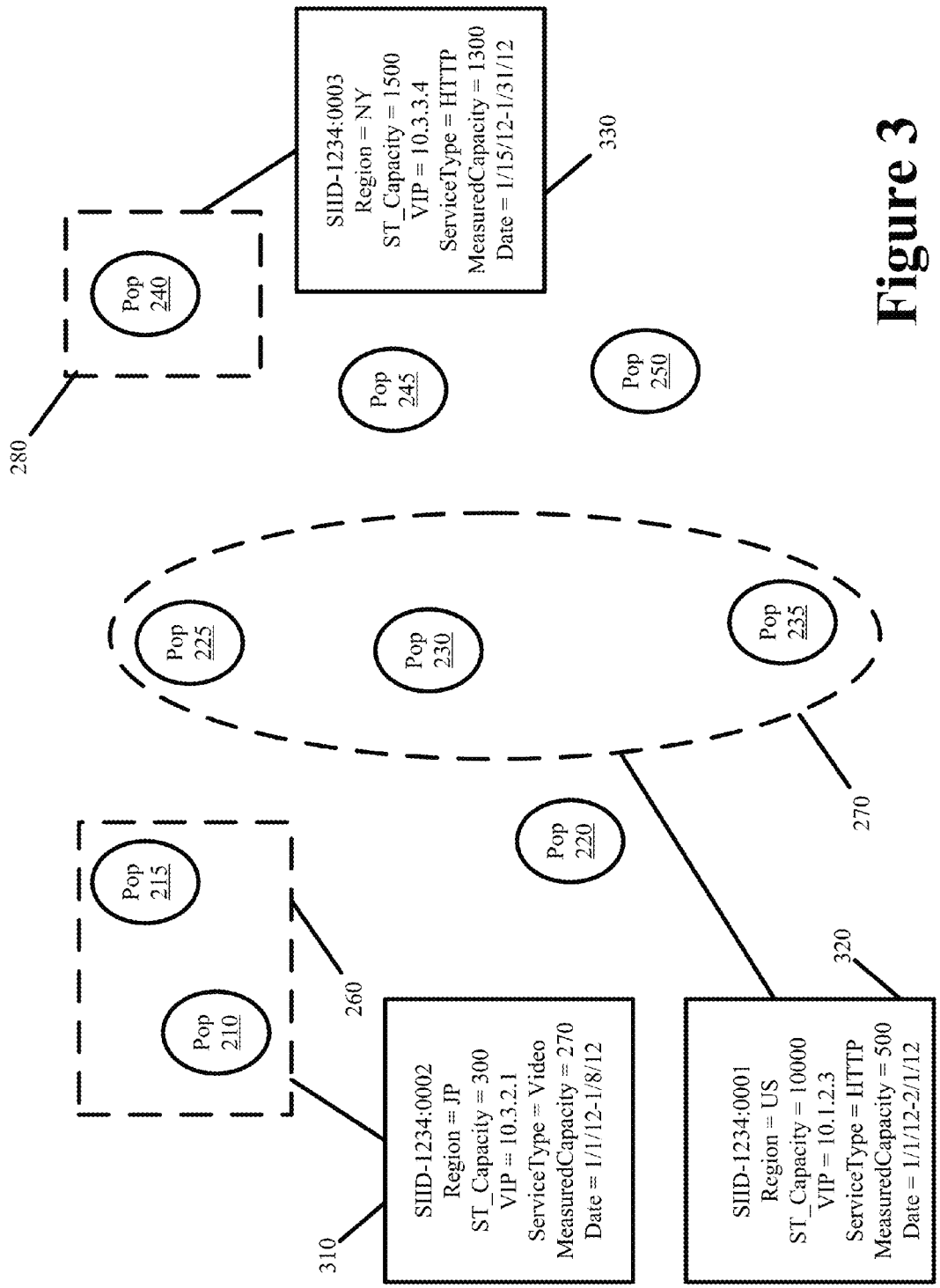
FIG. 3 conceptually illustrates a set of service attributes defined for each of the service instances of FIG. 2 in accordance with some embodiments.

FIG. 3 conceptually illustrates a set of service attributes defined for each of the service instances 260, 270, and 280 of FIG. 2 in accordance with some embodiments. Specifically, the set of service attributes 310 are defined for service instance 260, the set of service attributes 320 are defined for service instance 270, and the set of service attributes 330 are defined for service instance 280. The set of attributes 310, 320, and 330 include: (1) OCDN_Region to specify a code that represents the geographic region that is associated with the service instance, wherein the code is anticipated to be a multi-value attribute to allow for increasingly granular regional definitions, (2) OCDN_StatedCapacity to specify the allocated or assigned capacity for the service instance as estimated by the OCDNP offering the service instance, (3) OCDN_VIP for the VIP assigned to the service instance, (4) OCDN_ServiceType to specify the type of service (e.g., HTTP, HTTPS, FMS, etc.) that is supported by the associated service instance, (5) OCDN_MeasuredCapacity to specify the current value of the assessed capacity of the service instance as monitored by the Open CDN platform, (6) OCDN_Date to specify the dates when the service instance is available. It should be apparent to one of ordinary skill that other service attributes may be defined in addition to or instead of those illustrated in FIG. 3. For example, some additional service attributes may include: OCDN_Status to specify the availability status for the service instance, OCDN_Sharing to specify whether the service instance is available for bundling or partitioning, OCDN_Hostname to specify the resolvable hostname that represents the service instance (to be used if a secondary Domain Name System (DNS) based traffic management system will perform additional request routing outside the control of the Open CDN traffic management system), and OCDN_CapFeedback_URL to specify the URL from which current capacity or performance statistics for the service instance can be obtained. Certain service attributes can have different definable parameters.

In addition to specifying the service attributes, the OCDNP seller of a service instance specifies a price plan for the service instance. A price plan will contain information that defines one or more ways in which the capacity associated with the service instance can be purchased. A price plan contains at a minimum an effective date range and a cost or cost parameters. The effective date range specifies when the capacity associated with the service instance is available. The cost or cost parameters specifies the price, price ranges, or price tiers to acquire the capacity associated with the service instance. In some embodiments, the cost or cost parameters are defined according to one of the following price plans include: (1) a first-in price plan whereby bids that are at or above the ask price are accepted in the order that they are received until capacity associated with a service instance is depleted, (2) a highest bid price plan whereby bids are accepted from the highest bid price to the lowest bid price until capacity associated with a service instance is depleted, (3) a decaying price plan whereby the ask price specified for a service instance by an OCDNP is automatically decreased in intervals as the expiration window for the service instance approaches, (4) a tiered price plan whereby a rate structure is established based on bid volume with different rates associated with each bid volume tier, and (5) an any price plan that accepts bids from highest to lowest price in order to auction a service instance to the highest bidder.

The cost or cost parameters can be defined according to (1) a "wholesale rate" or (2) a "retail rate". In some embodiments, the wholesale rate specifies an OCDNP to capacity exchange rate and the retail rate specifies a higher rate for the capacity exchange to publish and sell the service instance at. The difference between the wholesale and retail rates is used in some embodiments to cover a service fee or a transaction fee for the capacity exchange to broker the exchange of capacity. The fee may also cover other services provided by the Open CDN platform (e.g., capacity allocation, statistics reporting, API maintenance, etc.). In some embodiments, the wholesale rate specifies an OCDNP cost for the capacity and the retail rate specifies a higher saleable price for that capacity that prevents OCDNP buyers from being able to resell capacity at a cost that would undermine the OCDNP seller's costs.

Figure 4:
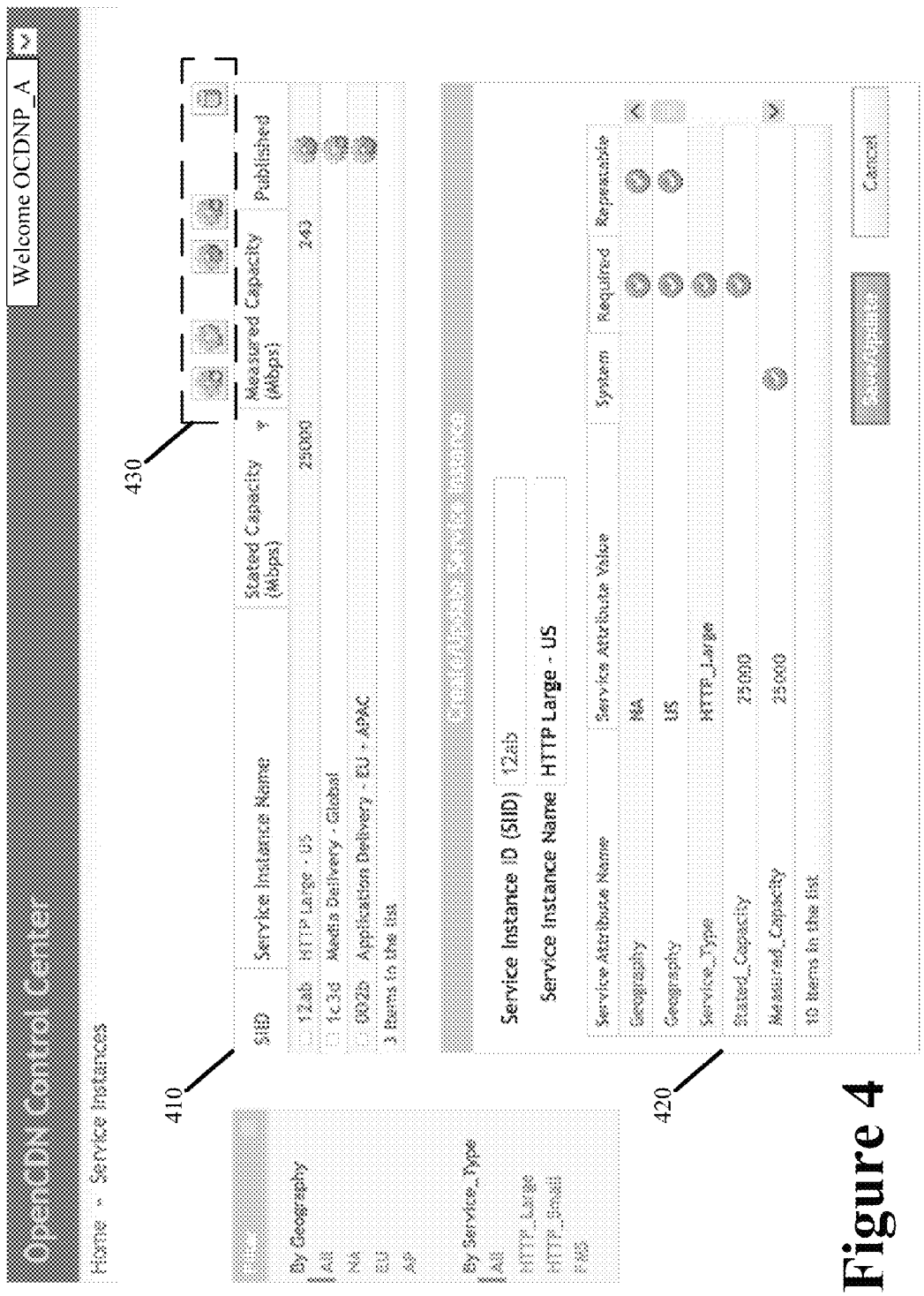
FIG. 4 presents an exemplary interface for defining a service instance in accordance with some embodiments.

In some embodiments, a service instance is defined using a web interface that is provided by an interface portal of the Open CDN platform. FIG. 4 presents an exemplary interface for defining a service instance in accordance with some embodiments. The interface includes a first view 410, a second view 420, and a set of tools 430. The first view 410 displays service instances that have been previously defined by an OCDNP. As shown, the first view 410 includes three defined service instances with each defined service instance having an assigned service instance identifier, a name for identifying the service instance, OCDNP stated capacity, verified capacity measured by the Open CDN platform, and status information as to whether the service instance has been published to the capacity exchange. Service attributes for a currently selected service instance are shown in the second view 420. In this figure, the second view 420 illustrates the service attributes that have been specified for the first defined service instance. As shown, the service attributes include the OCDN_Region (see Geography), OCDN_ServiceType, OCDN_StatedCapacity, and OCDN_MeasuredCapacity. OCDNP specified service attributes can be modified by selecting the corresponding service attribute value and entering a new value. The set of tools 430 control (1) the creation of a new service instance, (2) the publishing of a defined service instance, (3) the removal of a published service instance from the capacity exchange, and (4) the deletion of a defined service instance.

Once a service instance is defined, some embodiments of the Open CDN platform activate one or more verification probes to verify the available capacity specified for the service instance. The verification is performed because the OCDN_StatedCapacity attribute is an estimation of the capacity for a service instance as assigned by the OCDNP seller, where the estimation may be based on the number of servers or other resources physically provisioned and logically configured into the service instance. This estimate fluctuates and can be unreliable since capacity in the service provider's CDN varies widely based on a significant number of factors that vary with the type of content, request rate, and other factors not directly attributable to the service instance at the time of its provisioning. Therefore, the capacity exchange uses the verification probes to ensure a predefined and universally consistent measurement of the capacity, load, and headroom associated with all elements of capacity that contribute to the service instance's overall capacity and to provide a trended verification that the OCDN_StatedCapacity is actually observed to be accurate over time. In so doing, capacity purchasers are better able to assess the validity of the estimated remaining and future capacity of a service instance.

In some embodiments, the verification probes are a set of machines or processes that are distributed throughout the Internet and that are controlled by the Open CDN platform. The verification probes perform and/or collect various measurements to derive independent measures of the available capacity for the OCDNP defined service instance based on up-to-date network conditions and server resources. Some measurements include pinging the servers associated with the service instance to obtain latency measurements and downloading a beacon object to calculate throughput and overall capacity for the service instance. In addition to or instead of the active external measurements performed by the verification probes, various resource measurements from within each edge server or POP are generated and transmitted to and collected by the verification system.

The measurements performed by the verification probes are then published in conjunction with the OCDNP defined service instance to the capacity exchange. In some embodiments, publishing the service instance comprises storing the service instance definition to a database of the Open CDN platform that stores all published service instances. Verification can be performed before the service instance is published to the capacity exchange or at any time after the service instance is published to the capacity exchange. Some embodiments periodically verify the published service instances to reflect measured changes in network conditions and server resources over time.

To purchase some or all of a service instance, a OCDNP buyer first searches the capacity exchange using a web interface that is provided by the interface portal of the Open CDN platform. The OCDNP buyer formulates a query that specifies various qualifications including desired service attributes for the desired capacity. The qualifications can specify desired capacity, geographic regions, pricing, performance, service type, and availability dates as some examples. Upon receiving the query, the capacity exchange identifies published service instances that have service attributes meeting the buyer's specified qualifications. In preferred embodiments, the search is implemented using an "intersection" query. Such a query identifies the intersection of all service instances that match all service attribute name and value pairs (i.e., qualifications) specified in the search query. The resulting set of service instance identifiers is a list of all published service instances known to the capacity exchange that match the qualification supplied by the prospective purchaser.

Next, the capacity exchange analyzes a capacity allocation table associated with each identified service instance to determine whether sufficient capacity is actually available during a time period required by the buyer. The capacity allocation table identifies the amount of stated capacity that is available for a particular service instance at different periods of time. In some embodiments, the capacity allocation table tracks "puts" and "takes" to the particular service instance. A put identifies at least an amount of capacity and a time period in which the service instance seller adds capacity to the service instance. For example, a seller defines a service instance with 1,000 Mbps capacity for a three month duration at a particular POP. Subsequently, the seller obtains another 100 Mbps of capacity at that POP during the final month of the service instance. The seller then issues a put to add that additional 100 Mbps to the final month of the defined service instance. A take identifies a portion of the service instance that has been purchased. A take identifies at least an amount of capacity, a time period, a buyer identifier, a purchase price, and a capacity agreement identifier. A take can identify some amount of capacity that is less than the full amount of stated capacity for a service instance and in this manner, buyers can purchase portions of capacity from a service instance without purchasing the entirety of offered capacity. The remaining capacity of the service instance will be available for other buyers to purchase. Once all stated capacity or some threshold (i.e., 95%) is sold, the service instance will then be removed from the capacity exchange.

Based upon the analysis of the capacity allocation table for the service instances that are identified to satisfy the buyer's search criteria, the service instances are presented with one or more values that quantify the availability of capacity during the time period required by the buyer. For example, a service instance may be presented with a single value that quantifies the minimum amount of available capacity for the service instance during the time period qualified by the buyer. As another example, the service instance may be presented with minimum, average, and maximum values that quantify the available capacity for the service instance to better represent the puts and takes associated with that service instance during the time period qualified by the buyer. The buyer can proceed to purchase some or all of the available capacity of the service instance. To do so, the buyer submits an offer to purchase an identified service instance or engages in a bidding auction for that identified service instance using the interface portal of the Open CDN platform.

In some embodiments, if the purchase offer is approved, the buyer is provided confirmation and a contract is executed to enforce the transaction. This contract is stored in the capacity exchange as a capacity agreement. The capacity agreement specifies the terms for the contractual relationship between the capacity seller and the capacity buyer. These terms include identification of the acquired capacity including a date range, capacity purchased, capacity units, and capacity rate. The buyer can be charged an upfront fee for the purchase of the entirety or portion of the service instance. Alternatively, the capacity agreements can be used by a usage mediation and settlement facility of the capacity exchange to compute billing information to be applied to each OCDNP during each settlement cycle. In some embodiments, the capacity exchange operates to escrow a fee paid by the buyer until the end of a settlement cycle. This ensures that the seller is paid only upon performing per the terms of the capacity agreement. Additionally, the buyer may be charged a fluctuating fee that includes a first fee for total capacity of a service instance that was reserved during the settlement cycle and a second fee for the actual usage of that reserved capacity.

Figure 5:
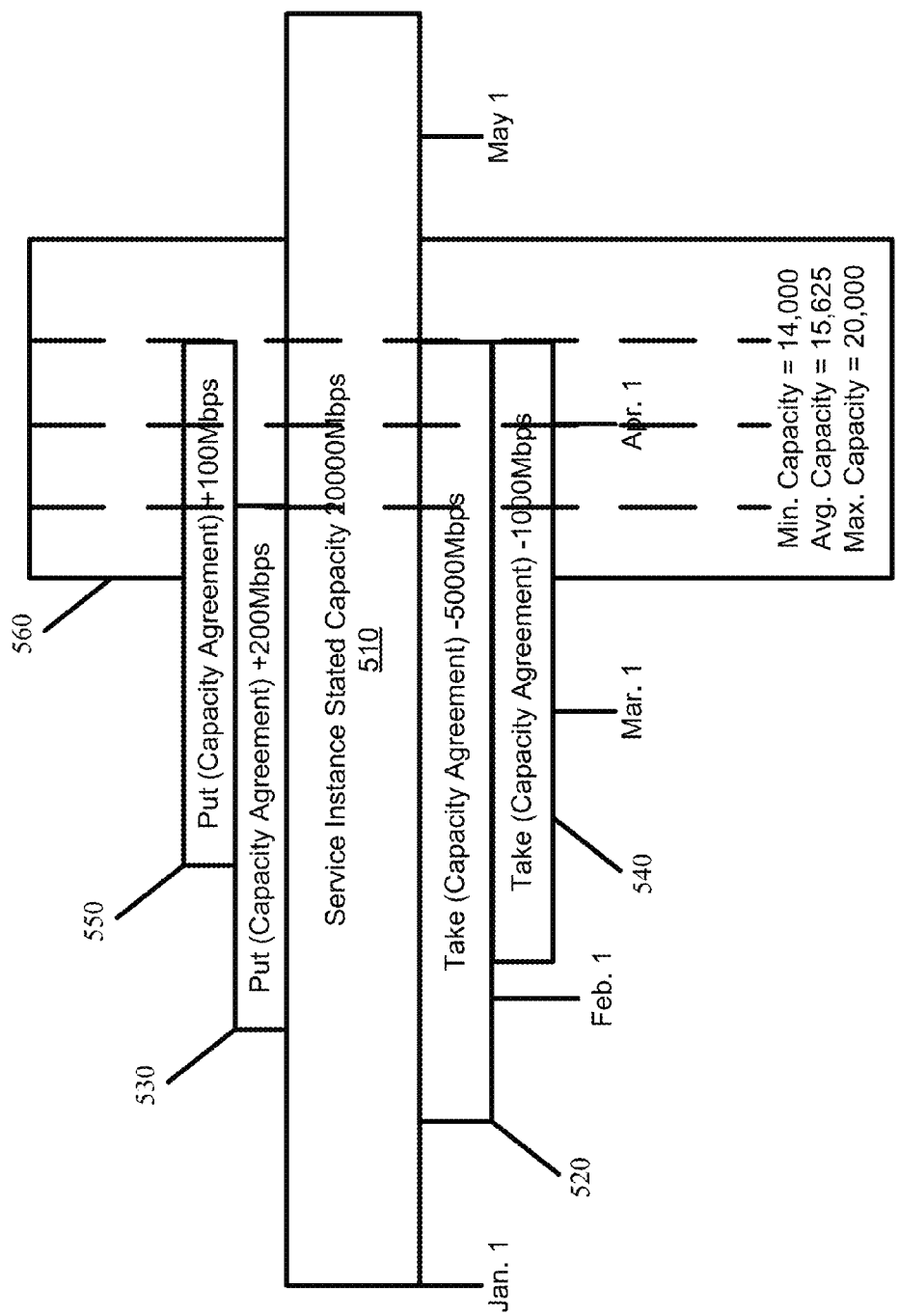
FIG. 5 conceptually illustrates a capacity allocation table for a service instance that is published to the capacity exchange in accordance with some embodiments.

As part of the sale of capacity from a service instance, the capacity exchange also updates the capacity allocation table for that service instance. Specifically, each portion of the service instance that is sold causes a new take to be entered in the capacity allocation table. FIG. 5 conceptually illustrates a capacity allocation table for a service instance that is published to the capacity exchange in accordance with some embodiments. The capacity allocation table identifies a service instance 510 with a stated amount of capacity (20,000 Mbps) that the seller provisions for others to purchase. The capacity allocation table also identifies puts (represented by the boxes above the service instance 510) and takes (represented by the boxes below the service instance 510) that modify the available amount of capacity for the service instance 510 over a period of time, where the period of time is represented by the horizontal length of the box representing the service instance 510.

As shown, the seller initially provisions 20,000 Mbps of capacity for the service instance 510. Take 520 represents that a buyer has executed a capacity agreement to purchase 5,000 Mbps for the duration that is represented by the horizontal length of the take 520. Put 530 represents the seller executing a capacity agreement to add an additional 200 Mbps of capacity to the service instance for the duration that is represented by the horizontal length of the put 530. Another take 540 is then executed to purchase another 1,000 Mbps of capacity from the service instance 510. Take 520 and take 540 may be executed by the same buyer or different buyers. In this manner, a service instance and its associated capacity can be sold off in different sized amounts of capacity for different lengths of time. Lastly, put 550 represents an additional 100 Mbps of capacity being added to the service instance 510 for the duration that is represented by the horizontal length of the put 550.

The box 560 may be representative of a query (or capacity request described below) that is submitted by a buyer, whereby the query specifies a duration and/or an amount of desired capacity. Since the capacity of the service instance changes based on the puts and takes, the buyer is presented with different values to indicate the availability of capacity for the service instance 510 during the indicated time period of box 560. As shown, the buyer is presented with the minimum, average, and maximum amounts of available capacity during the indicated time period of box 560. The minimum amount of available capacity during the indicated time period is 14,300 Mbps (20,000+200+100−5,000−1,000), the average amount of available capacity during the indicated time period is 14,125 Mbps, and the maximum amount of available capacity during the indicated time period is 20,000 Mbps. The buyer then has the option to submit a purchase offer for some or all of the available capacity of the service instance 510. It should be noted that the buyer's ability to purchase capacity from multiple different service instances allows the buyer to obtain a virtually unlimited amount of capacity and thereby dynamically scale its operations as needed without infrastructure or capacity restrictions.

In some embodiments, a search that is submitted by a potential capacity buyer can be saved to the exchange as a capacity request. This may occur when the service instances that have been published to the capacity exchange do not meet the qualifications that are specified by the buyer in the capacity request. Alternatively, a capacity request may be submitted to facilitate a reverse bidding process, whereby capacity sellers bid against one another to provide capacity for the capacity request. In some embodiments, the capacity exchange maintains a queue of capacity requests that are specified by different potential buyers of capacity. Capacity sellers can search the queue to identify capacity requests that they can fulfill according to qualifications specified by the capacity buyers as part of the capacity requests (e.g., desired amount of capacity, duration, geographic location, etc.). The capacity sellers can then make an offer to provide capacity to satisfy the capacity requests of a buyer. Accordingly, the capacity request allows for instantaneous or deferred capacity transactions, and for other commercial arrangements such as reverse bidding by a capacity seller.

Figure 6:
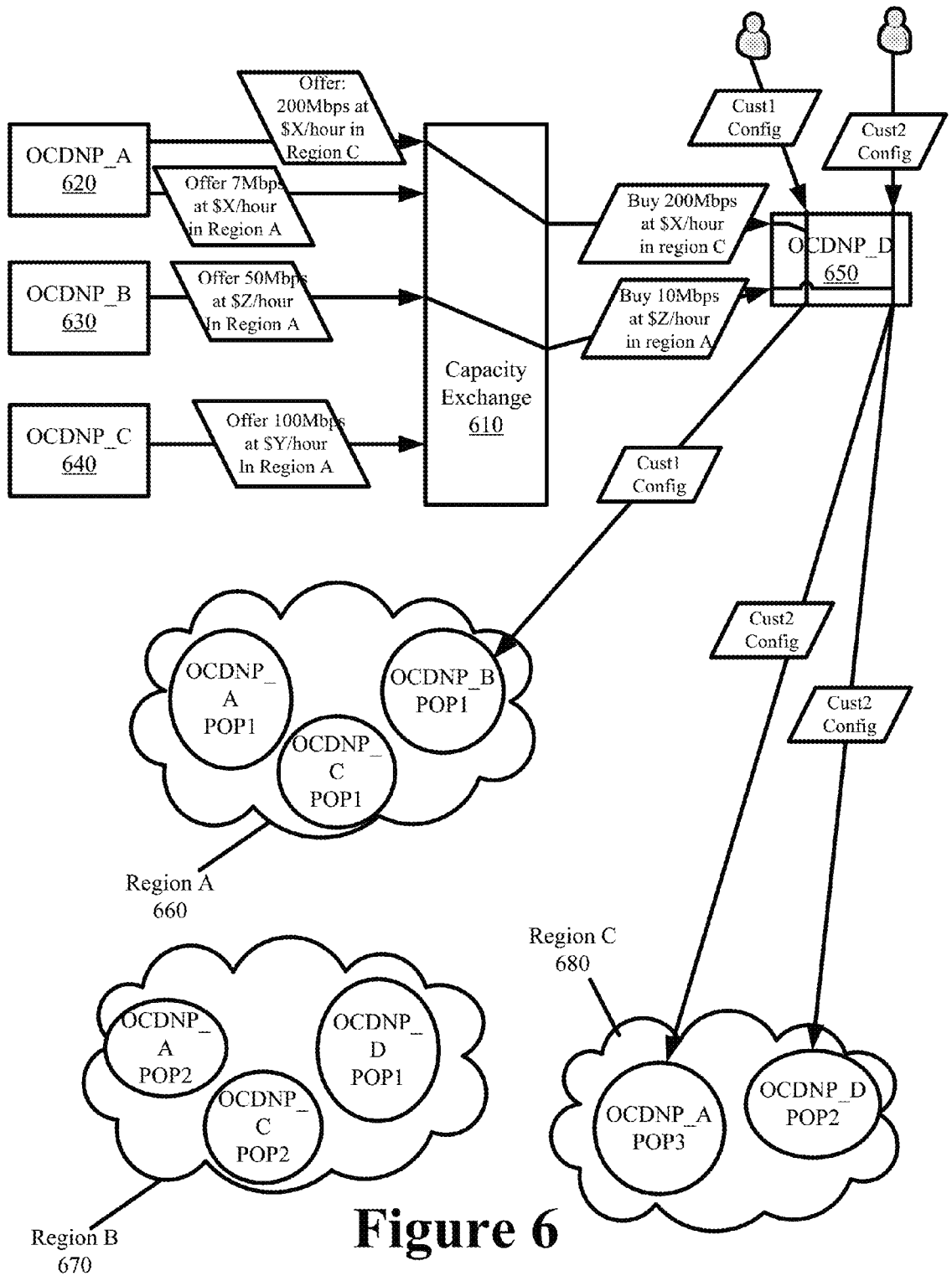
FIG. 6 conceptually illustrates the capacity exchange of the Open CDN platform brokering the exchange of capacity in accordance with some embodiments.

FIG. 6 conceptually illustrates the capacity exchange of the Open CDN platform brokering the exchange of capacity in accordance with some embodiments. The figure includes the capacity exchange 610, OCDNPs 620, 630, and 640 that participate in the capacity exchange 610 as service instance sellers, OCDNP 650 that participates in the capacity exchange 610 as a service instance buyer, POPs of the OCDNPs distributed across geographic regions, 660, 670, and 680, and customers 690 and 695 of OCDNP 650.

As shown, OCDNP 620 (i.e., OCDNP_A) has located at least one edge server in the geographic regions 660, 670, and 680 in order to establish a POP within each such geographic region; OCDNP 630 (i.e., OCDNP_B) has located at least one edge server in the geographic region 660 in order to a establish a POP within the geographic region 660; OCDNP 640 (i.e., OCDNP_C) has located at least one edge server in the geographic regions 660 and 670 in order to establish a POP within each such geographic region; and OCDNP 650 has located at least one edge server in the geographic regions 670 and 680 in order to establish a POP within each such geographic region.

OCDNPs 620, 630, and 640 publish service instances for their unused capacity in the geographic region 660 to the capacity exchange 610 along with geographic and cost service attributes related to the capacity being offered. Moreover, OCDNP 620 publishes a service instance for its unused capacity in geographic region 680 to the capacity exchange 610 along with geographic and cost service attributes related to the capacity being offered.

Next, OCDNP 650 searches the capacity exchange 610 to acquire additional capacity for its POP in the geographic region 680 and also to acquire capacity in the geographic region 660 where OCDNP 650 currently does not have a POP. As part of the search, OCDNP 650 specifies desired service attributes for the capacity it is looking to obtain. For example, these desired service attributes specify the amount of capacity desired, the geographic region where the capacity is desired, and the price OCDNP 650 is willing to pay for such capacity. The capacity exchange 610 then brokers the exchange of capacity by aligning the buyer (i.e., OCDNP 650) with the appropriate seller. Specifically, the capacity exchange 610 aligns the available service instance of whichever seller best matches the desired service attributes of the buyer. As shown, OCDNP 650 acquires all of OCDNP's 620 available capacity in the geographic region 680 while acquiring a fraction of OCDNP's 630 available capacity in the geographic region 660.

After acquiring the capacity, OCDNP 650 can configure the corresponding POPs of OCDNP 620 in the geographic region 680 and OCDNP 630 in the geographic region 660 to deliver content on behalf OCDNP 650 or more specifically, on behalf of customers 690 and 695 of OCDNP 650. As shown, the configuration for customer 690 of OCDNP 650 is deployed to the POP of OCDNP 630 in the geographic region 660 and the configuration for customer 695 of OCDNP 650 is deployed across the POPs of OCDNP 620 and OCDNP 650 in the geographic region 680.

As a result of the exchanged capacity in FIG. 6, OCDNP 620 fully avoids the sunk cost that is associated with having unused capacity in the geographic region 680, OCDNP 630 partially avoids the sunk cost that is associated with having unused capacity in the geographic region 660, OCDNP 650 is able to expand its capacity within the geographic region 680, and OCDNP 650 is able to establish an entirely new POP in the geographic region 660. Moreover, OCDNP 680 is able to obtain these advantages without the overhead of purchasing, configuring, and maintaining additional infrastructure in the geographic regions 660 and 680.

Figure 7:
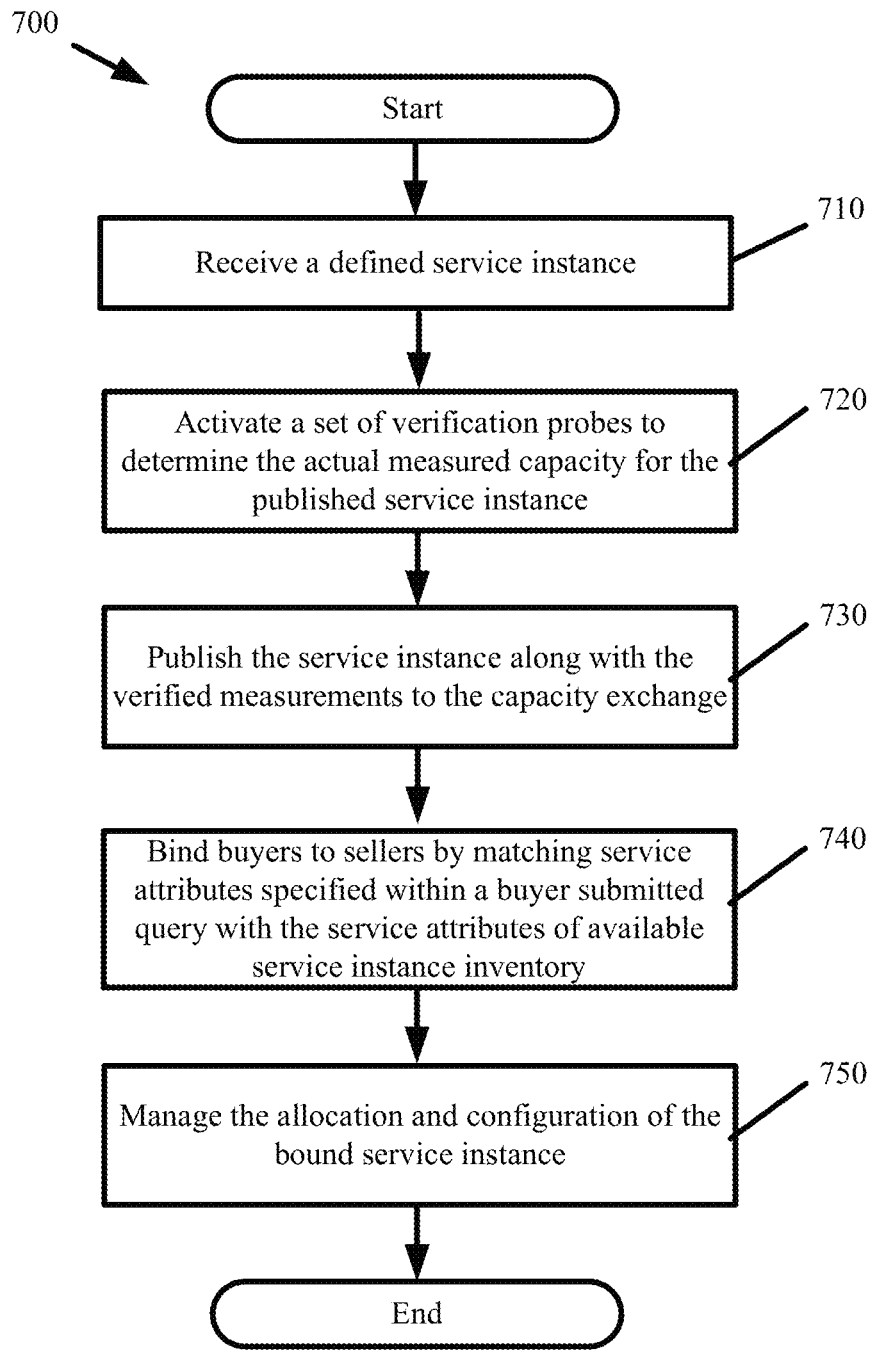
FIG. 7 presents a process performed by the capacity exchange of the Open CDN platform to facilitate the brokering of CDN capacity in accordance with some embodiments.

FIG. 7 presents a process 700 performed by the capacity exchange of the Open CDN platform to facilitate the brokering of CDN capacity in accordance with some embodiments. The process 700 commences when at least one participating OCDNP defines a service instance that is received (at 710) by the capacity exchange. The process activates (at 720) a set of verification probes to determine the actual measured capacity for the received service instance. The process publishes (at 730) the service instance along with the verified measurements to the capacity exchange where it becomes available for other OCDNPs to purchase. The process brokers the exchange of the service instance by matching (at 740) buyers to sellers. The process facilitates the matching of buyers to sellers by matching qualifications specified with a buyer submitted query with the service attributes of available service instance inventory. This matching may include matching one buyer to one seller or matching one buyer to many sellers. When one buyer is matched to one seller, the buyer can purchase some or all of the capacity in a service instance that is offered by that seller. When one buyer is matched to many sellers, the buyer can purchase some or all of the capacity from different service instances that are offered by different sellers. Once the exchange of capacity is complete, the process manages (at 750) the allocation and configuration of that capacity as described in Section II below.

II. Capacity Allocation and Management

In some embodiments, the Open CDN platform manages the allocation and configuration of a service instance that was successfully sold or auctioned through the capacity exchange. This involves mapping a customer configuration from a first OCDNP to a second OCDNP and setting traffic management services so that requests are optimally routed between the first OCDNP and the second OCDNP in a seamless manner. Configuration mapping is complicated by virtue of the fact that each OCDNP is independently operated. This results in each OCDNP having proprietary or customized infrastructure and software that may be incompatible with the infrastructure and software of another OCDNP.

To overcome these obstacles, the Open CDN platform provides a connector agent and an application programming interface (API) to facilitate intercommunication between the OCDNPs and between each OCDNP and the Open CDN platform. Intercommunication involves (1) the passing and deployment of a customer configuration between two or more OCDNPs, (2) the passing and execution of operational commands between two or more OCDNPs, and (3) the passing and reporting of statistical data between two or more OCDNPs. The description for the passing and reporting of statistical data is provided in Section III below.

In some embodiments, intercommunication within the Open CDN platform requires the ability to uniquely identify each OCDNP participant and each customer of each OCDNP participant. This is in addition to uniquely identifying the service instances as was described above. The unique identifiers provide mechanisms with which to deploy and monitor customer configurations across the Open CDN platform and the participating OCDNPs. In some embodiments, the Open CDN platform assigns an identifier to uniquely identify each OCDNP participating in the Open CDN platform. This unique identifier is referred to as the service provider identifier or OCDN_SPID. In some embodiments, the Open CDN platform assigns an identifier to uniquely identify each customer of each OCDNP. This unique identifier is referred to as the customer identifier or OCDN_CID. In some embodiments, the identifiers are assigned to an OCDNP when the OCDNP registers with the Open CDN platform, though the identifiers may be dynamically assigned as needed.

In some embodiments, the OCDN_SPID is a multi-digit hexadecimal value that is uniquely assigned to each OCDNP. This identifier can be used to conceal the identity of the OCDNP in the Open CDN platform and to prevent other OCDNPs from obtaining insight as to the operations of the OCDNP. For instance, the OCDN_SPIDs hide which OCDNPs are in need of capacity and which OCDNPs have excess capacity. In some embodiments, the OCDN_SPIDs are assigned by an identifier assignment engine that is a component of the Open CDN platform.

In some embodiments, the OCDN_CID is a multi-digit hexadecimal value that is uniquely assigned to each customer of each OCDNP. Specifically, the OCDN_CID is assigned to each customer that has its configuration partially or wholly deployed to a foreign OCDNP. In some embodiments, the OCDN_CID is comprised of other identifiers. For example, the OCDN_CID may be formatted as SPID:CID, wherein the SPID is the OCDN_SPID assigned to each OCDNP and the CID is a native customer identifier used by the OCDNP. Alternatively, the OCDN_CID may be formatted as a sixteen digit hexadecimal value formatted as SPID:WID:PID:CID, wherein the WID is a wholesaler identifier and the PID is a partner identifier which are also native identifiers of the OCDNP. These additional identifiers provide greater flexibility in the identification and tracking of customers within the Open CDN platform. The OCDN_CID is used when configuring a configuration across multiple OCDNPs, modifying a configuration spanning multiple OCDNPs, issuing commands for configurations spanning multiple OCDNPs, and monitoring the performance of a configuration across multiple OCDNPs. By using a combination of the SPID and CID to form the OCDN_CID, the system can assure that configurations will not "collide" when propagated among the participating OCDNPs. Since each OCDNP operates autonomously and shares information with the Open CDN platform when using purchased capacity, it is a foundational principle that the namespace of each CDN is independently managed and that one of the roles of the Open CDN connector agent and API is to prevent collisions across namespaces by providing a globally unique identifier for elements that are shared throughout the Open CDN platform and amongst participating OCDNPs. The identifiers explicitly identified for preferred embodiments are the service instance identifiers and customer identifiers described above.

The connector agent is an active process that is integrated with each participating OCDNP on the administrative server or other component of the OCDNP. Alternatively, the connector agent may be a separate component with communicative access to various components of the OCDNP. The connector agent may be implemented as a set of software modules or as specialized hardware. The connector agent serves as the interface with which the OCDNP communicably couples to the Open CDN platform and more specifically, communicably couples with other OCDNPs for inter-CDN communication. As will be described in greater detail below, the connector agent is the interface for sending and receiving configurations, commands, and statistical data for inter-CDN deployed configurations.

The Open CDN API defines translations (1) between native OCDNP identifiers and the Open CDN platform identifiers and (2) between native OCDNP configuration formats and an Open CDN configuration format. The connector agent utilizes the translations defined in the Open CDN API to map between the different identifiers and configuration formats when intercommunication is necessary. The connector agent and the Open CDN API provide the means with which OCDNPs can participate in the Open CDN platform without changing their native formats. In this manner, any OCDNP can seamlessly participate in the Open CDN platform while continuing to operate as a standalone OCDNP.

Each OCDNP discloses its native identifiers and native configuration formats to the Open CDN platform so that translations may be defined for those identifiers and formats in the Open CDN API. In some embodiments, an OCDNP discloses the native identifiers and the native formats when registering to participate in the Open CDN platform. An Open CDN platform administrator then defines the translations for converting between the different native identifiers and the different native configuration formats of the different OCDNPs. The translations are entered into the Open CDN API.

In some embodiments, an intermediary Open CDN configuration format is defined and used when converting between native configuration formats of two OCDNPs. The Open CDN configuration format specifies a set of minimal configuration parameters that each participating OCDNP supports. This is so the Open CDN platform can offer the same functionality on different CDNs. Some such settings include settings for allocating and configuring a service instance, invoking global commands such as load and purge, and retrieving statistics.

In some embodiments, the intermediary Open CDN configuration format facilitates intercommunication when the Open CDN platform is implemented as a distributed framework. In some such embodiments, a connector agent and Open CDN API are integrated with each OCDNP. However, each Open CDN API may be defined with a different set of translations. Specifically, each Open CDN API is defined with translations for translating between the native format of the OCDNP that it is integrated with and the Open CDN format. It is anticipated that a connector agent and Open CDN API will be required for each participating CDN technology platform provided by various service providers who desire to allow their technology/platform to participate in the Open CDN platform.

Figure 8:
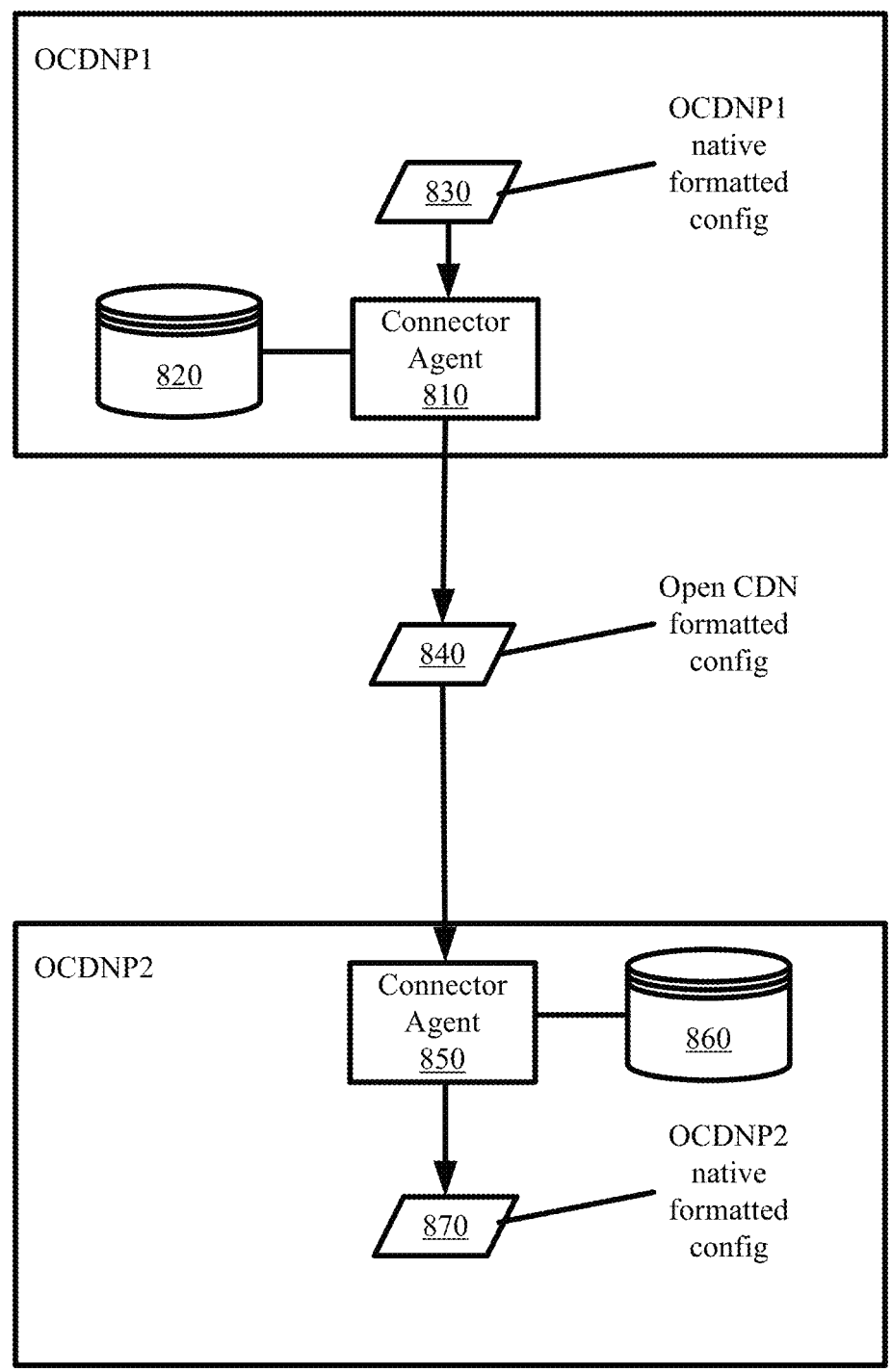
FIG. 8 conceptually illustrates passing a configuration from a first OCDNP to a second OCDNP when the Open CDN platform is implemented as a federated platform.

FIG. 8 conceptually illustrates passing a configuration from a first OCDNP to a second OCDNP when the Open CDN platform is implemented as a federated platform. In this figure, the connector agent of the first OCDNP 810 uses the Open CDN API of the first OCDNP 820 to map the configuration 830 from the native format of the first OCDNP to the Open CDN format 840. Though not shown, the mapping may include translating from a native customer identifier that is associated with the configuration 830 to the corresponding Open CDN customer identifier. Next, the connector agent of the first OCDNP 810 passes the Open CDN formatted configuration 840 to the connector agent of the second OCDNP 850. The connector agent of the second OCDNP 850 uses the Open CDN API of the second OCDNP 860 to map the configuration from the Open CDN format 840 to the native format of the second OCDNP 870. Though not shown, this mapping may also include translating from the Open CDN customer identifier to a native customer identifier used within the OCDNP 850. Once mapping to the native format is complete, the connector agent forwards the configuration 870 for deployment to capacity of the second OCDNP 850. As part of the deployment, the second OCDNP 850 configures the one or more edge servers that provide the capacity for the identified service instances according to the remapped configuration. Additionally, the second OCDNP configures its internal traffic management service so that requests for content associated with the configuration are routed to the most optimal edge server of the configured edge servers. This may include updating Domain Name System (DNS) tables with CNAMEs or IP addresses for the appropriate edge servers. It should be apparent that for purposes of simplifying the discussion the mappings for and passing of other identifiers were omitted from the discussion and the figure. Accordingly, it should further be apparent that the connector agents and Open CDN APIs may also perform mappings between native customer identifiers and pass service instance identifiers such that the foreign OCDNP can identify who the configuration belongs to and identify where the configuration is to be deployed.

In some embodiments, the two stage mapping of FIG. 8 is replaced with a direct mapping that translates from the native configuration format of a first OCDNP to the native configuration format of any other OCDNP. In some such embodiments, the Open CDN APIs at each OCDNP are modified to include translations for converting between native identifiers and configuration formats to foreign identifiers and configuration formats of any other OCDNP. Accordingly, when passing a native configuration from a first OCDNP to a second OCDNP, the connector agent utilizes the Open CDN API at the first OCDNP to directly map from the native identifiers and configuration formats of the first OCDNP to the native identifiers and configuration formats of the second OCDNP. In some other embodiments, the Open CDN API is centrally managed by the Open CDN platform and each OCDNP is enhanced with a connector agent that utilizes that centralized Open CDN API for configuration mapping and other intercommunication.

Figure 9:
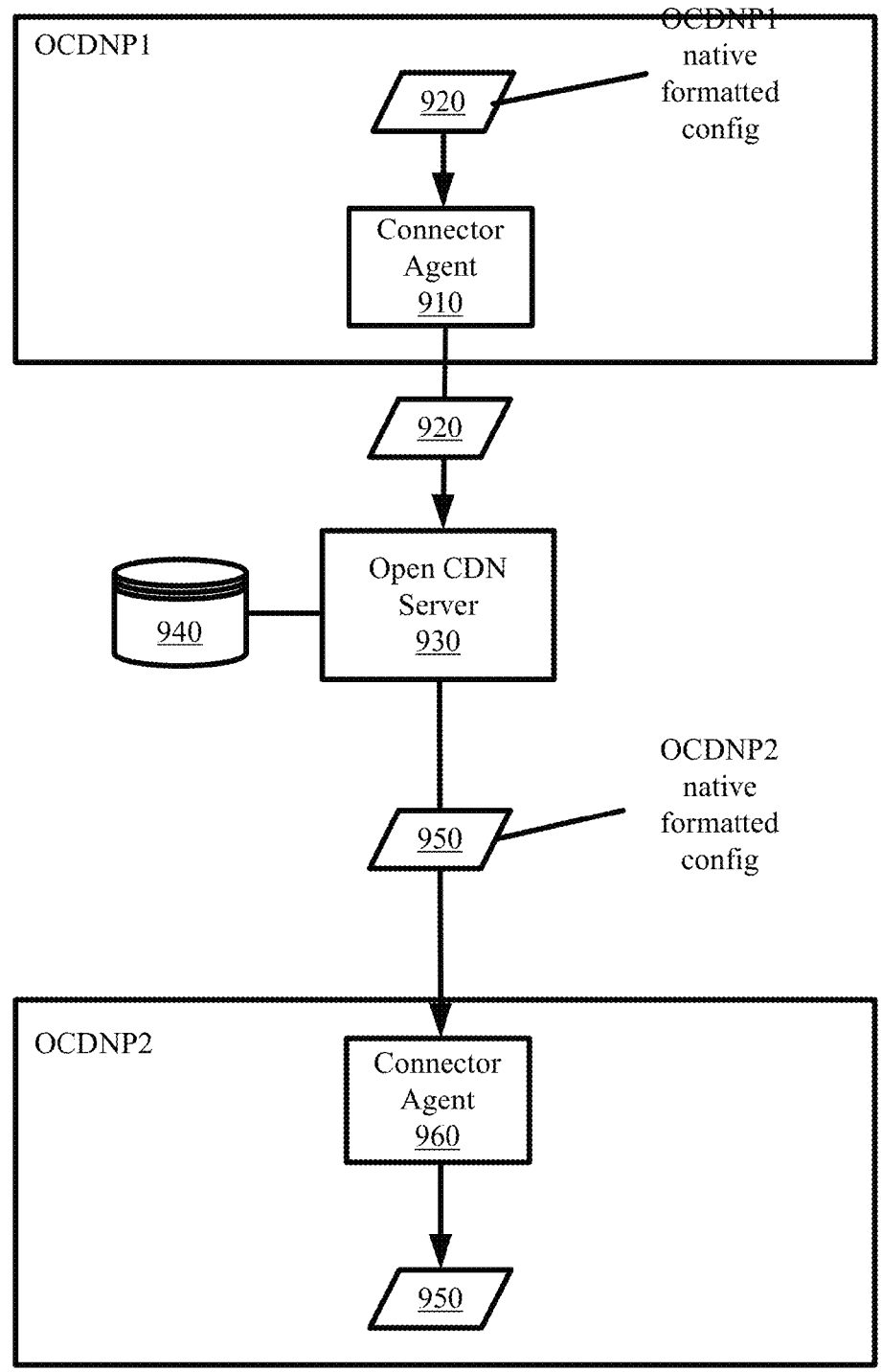
FIG. 9 conceptually illustrates passing a configuration from a first OCDNP to a second OCDNP when the Open CDN platform is implemented with a centrally managed Open CDN API.

FIG. 9 conceptually illustrates passing a configuration from a first OCDNP to a second OCDNP when the Open CDN platform is implemented with a centrally managed Open CDN API. In this figure, the connector agent of the first OCDNP 910 passes the configuration 920 in the native format of the first OCDNP to Open CDN server 930 that includes the centrally management Open CDN API 940 (the Open CDN server is described below in Section IV). The connector agent 910 also passes a destination address for the second OCDNP that is to receive the configuration and/or other identification information such as the service instance the configuration is to be deployed to at the second OCDNP (not shown in the figure). The Open CDN server 930 translates the configuration from the native format of the first OCDNP to the native format of the second OCDNP (as denoted by reference marker 950). This translation may be performed without use of the intermediary Open CDN format. The Open CDN server 930 then passes the reformatted configuration 950 to the connector agent of the second OCDNP 960 at which point the configuration 950 can be deployed to capacity of the second OCDNP.

In some embodiments, each OCDNP may configure its infrastructure according to an agreed upon set of identifiers and formats. This may include reconfiguring the resources of the OCDNPs with a common set of APIs provided by a particular OCDNP or provided by an administrator of the Open CDN platform. For example, all OCDNPs agree to deploy APIs of the EdgeCast CDN across their native infrastructures to facilitate CDN operation, even though branding and control is independently retained by each OCDNP. In such instances, translation mapping is not necessary and configurations can be shared across different OCDNPs without modification.

In some embodiments, the Open CDN platform provides a global traffic management service to supplement the existing traffic management services of each of the OCDNPs. The global traffic management service performs a first level routing decision for requests directed to configurations that have been deployed across two or more OCDNPs. The first level routing decision involves forwarding the content request to the traffic management service of the OCDNP that can optimally respond to the request. Once forwarded, the traffic management service for the selected OCDNP takes over and selects an edge server of the OCDNP to optimally service the request. In some embodiments, the first level routing decision is based on monitored load, performance, and capacity of the OCDNPs to which a configuration has been deployed. Accordingly, the Open CDN platform continually probes the OCDNPs to derive measurements for the load, performance, and capacity available at each OCDNP.

It should be apparent that many different traffic management schemes may be applied in the Open CDN platform. In one such alternative traffic management scheme, the first level routing decision can be based on direct monitoring of the edge servers. In some such embodiments, the Open CDN platform continually probes the edge servers that are associated with the service instances sold through the capacity exchange and the Open CDN platform maintains a list of inter-OCDNP content that is hosted by these servers such that a direct routing decision can be made by the global traffic management service.

Figure 10:
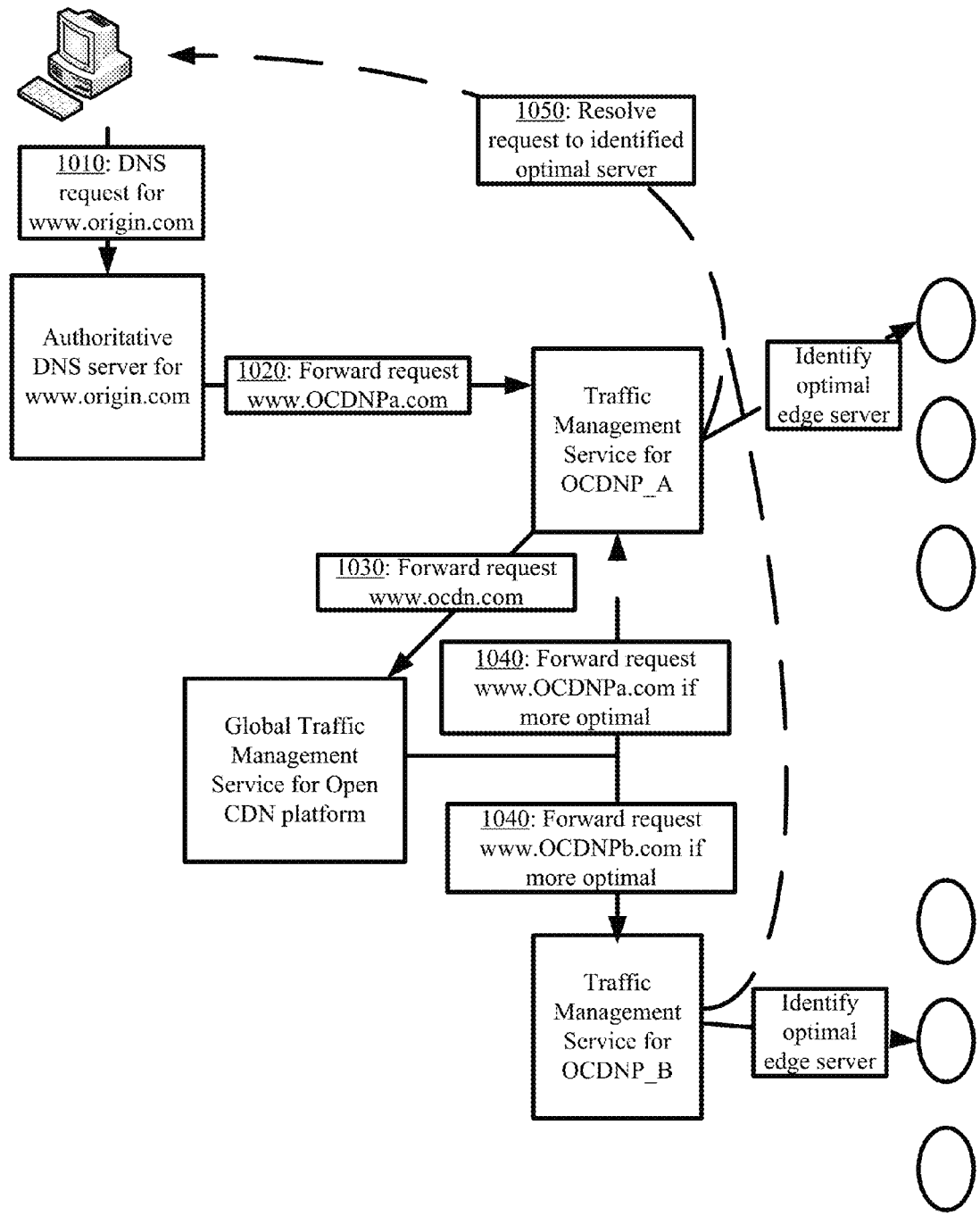
FIG. 10 illustrates the global traffic management service of the Open CDN platform in accordance with some embodiments.

FIG. 10 illustrates the global traffic management service of the Open CDN platform in accordance with some embodiments. The process begins (at 1010) when a content consumer submits a request for content. Such a request is usually in the form of a DNS request though other request formats can be supported by the Open CDN platform. The request may initially be directed (at 1010) to the domain of the content originator (e.g., www.origin.com) or to the domain of OCDNP_A that the content originator has contracted with to deliver content on its behalf (www.ocdnpa.com). When the request is directed to the domain of the content originator, the traffic management services of the content originator (i.e., the authoritative DNS server for the content originator domain) will forward (at 1020) the request to the traffic management services of OCDNP_A (i.e., the authoritative DNS server for the OCDNP_A domain). Typically, the request is forwarded by use of a CNAME entry in the authoritative DNS server of the content originator, wherein the CNAME points to the OCDNP_A domain.

When the request is for content of a customer whose configuration is wholly hosted by the OCDNP_A, the OCDNP_A traffic management service will resolve the request and identify the IP address or virtual IP address of the edge server or edge server load balancer that optimally serves the requested content from within the OCDNP_A. However, when the request is for content of the customer whose configuration is deployed to OCDNP_A and at least one foreign OCDNP, the OCDNP_A traffic management service will forward (at 1030) the request to the Open CDN global traffic management service (i.e., the authoritative DNS server for the Open CDN platform). This requires a configuration change that each OCDNP makes to their native traffic management service whenever a customer's configuration is deployed to a service instance of a foreign OCDNP. The configuration change may include using a CNAME entry to redirect the request to the Open CDN global traffic management service. Alternatively, the configuration change may include recursively resolving the request so that the request is resent to the Open CDN global traffic management service.

The Open CDN global traffic management service maintains a table for what content or what customer configurations are deployed across which OCDNPs. The Open CDN global traffic management service also maintains performance parameters for each of the OCDNPs such as geographic location, load, latency, bandwidth, etc. In some embodiments, the performance parameters are obtained directly from probes of each of the OCDNPs or from the traffic management service (e.g., the DNS servers) of each of the OCDNPs. Additionally or alternatively, the Open CDN platform may activate its own set of probes to acquire the performance parameters as needed or on a periodic basis. From these performance parameters, the Open CDN global traffic management service identifies which of the OCDNPs hosting the requested content can optimally serve the requested content to the content consumer. This decision can be based on the geographic proximity of the service instance hosting the content to the requestor or other parameters including load, performance, or capacity. Alternatively, this decision can be made generally based on the geographic proximity of the OCDNP or load, performance, or capacity parameters of the OCDNPs. The Open CDN global traffic management service then forwards (at 1040) the request to the traffic management service of the optimal OCDNP where the request is resolved (at 1050) to the edge server that optimally serves the content to the content consumer.

In this manner, the Open CDN global traffic management service seamlessly routes content requests to an optimal edge server irrespective of whether the optimal edge server is operated by a native OCDNP or a foreign OCDNP. The Open CDN global traffic management service performs the routing by leveraging existing traffic management services of each OCDNP. Moreover, traffic management services of the OCDNPs are only minimally modified to support the global traffic management service function. Specifically, the OCDNP traffic management service first checks whether an incoming request is for content that is hosted wholly within the native OCDNP or is for content that is hosted using at least one foreign OCDNP. If the request is for content that is wholly hosted within the native OCDNP, the traffic management service resolves the request as it would if operating independent of the Open CDN platform. If the request is for content that is hosted by at least two OCDNPs, then the request is forwarded to the Open CDN global traffic management service where a decision is made as to which OCDNP can optimally serve the request. It should be apparent that the global traffic management service can supplement any existing OCDNP traffic management service such as a single-tier or multi-tier DNS resolution service or an Anycast resolution service.

To further support seamless scaling of OCDNP capacity, the Open CDN platform seamlessly propagates global commands across the participating OCDNP. For example, a customer may issue a global load command for all edge servers deployed with the configuration to preload certain content to cache. Alternatively, the customer may issue a global purge command for all edge servers deployed with the configuration to remove all instances of a particular object from cache. When the configuration is deployed using capacity of a single OCDNP, the global commands are issued within the OCDNP as normal. However, when a configuration is deployed using capacity of at least two OCDNPs, the Open CDN API performs the command propagation and translation that is necessary to globally issue the command across the OCDNPs.

Figure 11:
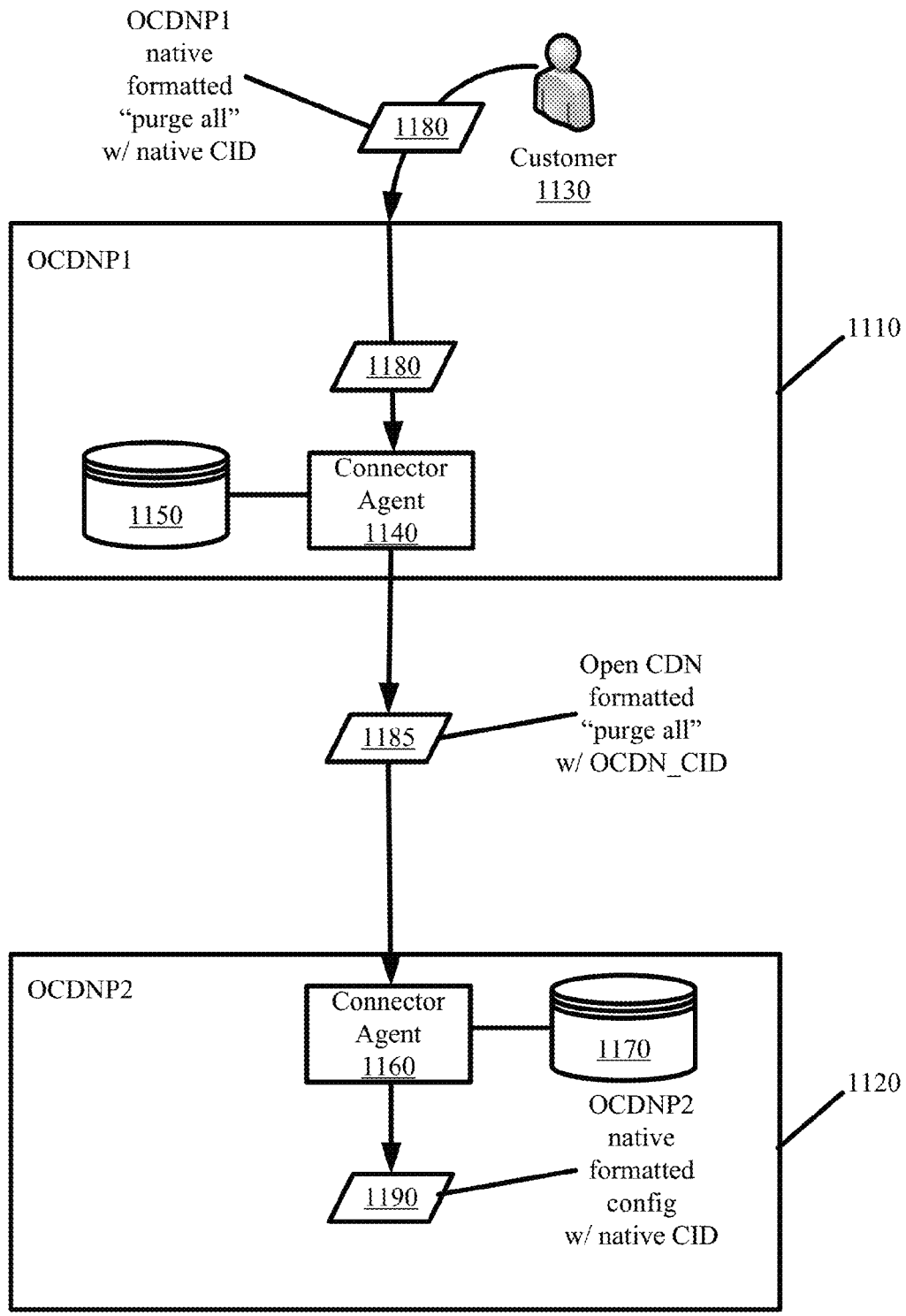
FIG. 11 conceptually illustrates intercommunicating global commands across different OCDNPs when the Open CDN platform is implemented with a distributed set of Open CDN APIs.

FIG. 11 conceptually illustrates intercommunicating global commands across different OCDNPs when the Open CDN platform is implemented with a distributed set of Open CDN APIs. The process of intercommunicating commands is similar to the process of configuration reformatting described with reference to FIG. 8 above. This figure presents OCDNP 1110 and OCDNP 1120 that participate in the Open CDN platform and customer 1130 of OCDNP 1110. OCDNP 1110 is enhanced with connector agent 1140 and Open CDN API 1150 and OCDNP 1120 is enhanced with connector agent 1160 and Open CDN API 1170. It is assumed in this figure that the configuration for the customer 1130 has been deployed to capacity of OCDNP 1110 and OCDNP 1120.

The customer 1130 utilizes an interface of the OCDNP 1110 to submit a "purge all" command 1180. This interface would be the same interface of OCDNP 1110 that the customer 1130 would access when the OCDNP 1110 operates independent of the Open CDN platform. The OCDNP 1110 internally executes the command 1180 as it normally would operating independent of the Open CDN platform. However, the command 1180 also passes to the connector agent 1140 running on the OCDNP 1110.

The connector agent 1140 checks a first table of the Open CDN API 1150 to determine whether the configuration for the customer 1130 has been deployed to a foreign OCDNP. The first table identifies which customer configurations of OCDNP 1110 have been deployed to which foreign OCDNPs. In this figure, the first table identifies that the configuration for customer 1130 has been deployed to OCDNP 1120.

Upon identifying that the configuration has been deployed to a foreign OCDNP, the connector agent 1140 accesses a second table of the Open CDN API 1150 that translates between native command formats of OCDNP 1110 to Open CDN command formats. The connector agent 1140 then uses the second table to map the "purge all" command from the OCDNP 1110 native format to the equivalent "purge all" command in the Open CDN format.

The connector agent 1140 then utilizes a third table of the Open CDN API 1150 to map the native identifier for customer 1130 to the corresponding Open CDN platform customer identifier (i.e., OCDN_CID). The Open CDN formatted command with the OCDN_CID 1185 is then passed to the connector agent 1160 of OCDNP 1120.

The connector agent 1160 performs a reverse mapping using the Open CDN API 1170 of OCDNP 1120 to 1) map the Open CDN formatted command to a native OCDNP 1120 command and 2) map the OCDN_CID to a native customer identifier. The connector agent 1160 then issues the native formatted command with the native customer identifier 1190 to the appropriate resources (i.e., edge servers) for execution in OCDNP 1120. It should be apparent that in some embodiments, the service instance identifiers are passed along with the command.

Figure 12:
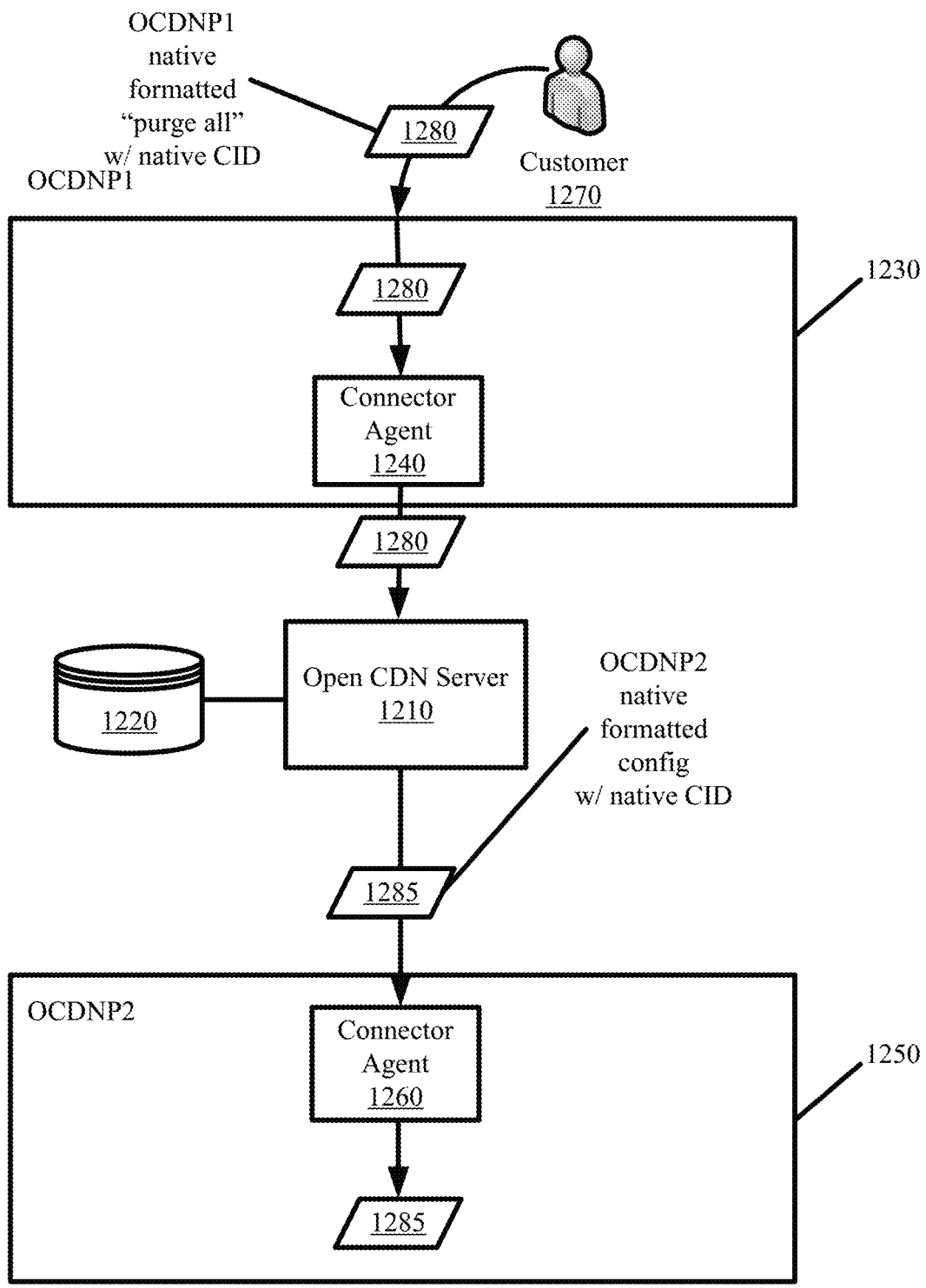
FIG. 12 conceptually illustrates intercommunicating global commands across different OCDNPs when the Open CDN platform is implemented with a centralized Open CDN API.

FIG. 12 conceptually illustrates intercommunicating global commands across different OCDNPs when the Open CDN platform is implemented with a centralized Open CDN API. This figure presents an Open CDN server 1210 with a centralized Open CDN API 1220, OCDNP 1230 enhanced with connector agent 1240, and OCDNP 1250 enhanced with connector agent 1260.

Customer 1270 utilizes an interface of the OCDNP 1230 to submit a "purge all" command 1280. As in FIG. 11, OCDNP 1230 internally executes the command 1280 as it normally would operating independent of the Open CDN platform and the command 1280 passes to the connector agent 1240.

In this figure, the connector agent 1240 maintains a table for configurations of OCDNP 1230 that have been exposed to a foreign OCDNP. It is assumed that the configuration of customer 1270 has been exposed to OCDNP 1250 such that the connector agent 1240 forwards the "purge all" command 1280 in the OCDNP 1230 native format to the Open CDN server 1210. The connector agent 1240 also forwards the customer identifier in the OCDNP 1230 native format to the Open CDN server 1210. In some embodiments, the connector agent 1240 also identifies OCDNP 1250 as the destination for the command though this information can also be obtained from the centralized Open CDN API 1220 based on the customer identifier. More specifically, the connector agent 1240 may identify the service instances of the OCDNP 1250 where the customer's configuration is located.

The Open CDN server 1210 utilizes the centralized Open CDN API 1220 to map the command from the OCDNP 1230 native format to the OCDNP 1250 native format and to map the customer identifier from the native format of CNDSP 1230 to the native format of OCDNP 1250. The reformatted command and identifier 1285 are then passed to the connector agent 1260 of OCDNP 1250 which then disseminates the command for execution within OCDNP 1250.

Based on the foregoing, it should be apparent that the Open CDN platform is a non-intrusive and seamless platform that allows each participating OCDNP to retain its own set of customers while continuing to provide CDN service directly to those customers. When additional capacity is needed, such capacity is purchased by the OCDNP and then seamlessly integrated to scale a customer configuration without the customer being aware that its configuration has been fully or partially deployed using capacity of another OCDNP. In fact, customers continue to utilize the interfaces or portals provided by the OCDNP to which they are a customer of in order to specify configurations, issue commands, or view statistics about the configuration. As a result, the Open CDN platform promotes OCDNP participation within the Open CDN platform by allowing OCDNPs to continue their day-to-day operations as normal, keep a majority of their infrastructure and operation private, and interact with the Open CDN platform only as necessary.

III. Log Reporting

New and improved systems and methods are needed to provide log reporting and log processing for the Open CDN platform. The log reporting challenges of the Open CDN platform include how to provide logs and derived usage functionality for the OCDNPs and customers of the OCDNPs that have configurations deployed to at least one foreign OCDNP (1) where the produced logs detailing transactions performed and performance realized for the customer configuration reside on servers of independently operated OCDNPs and (2) where the servers and existing log reporting systems of the OCDNPs operate using different proprietary or customized software and hardware.

Figure 13:
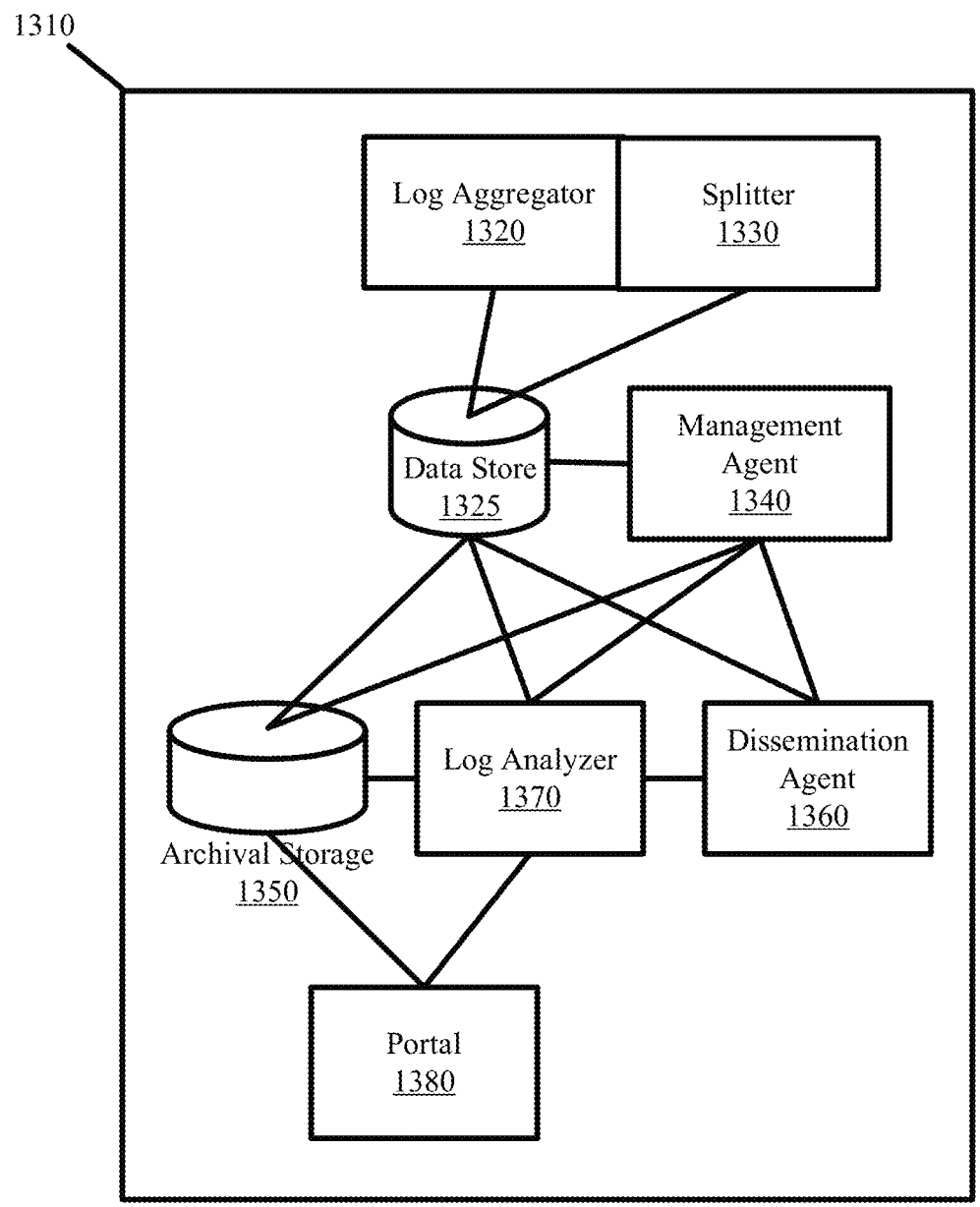
FIG. 13 illustrates various components of the log reporting system in accordance with some embodiments.

To address these and other issues, some embodiments provide log reporting systems and methods for a federation of OCDNPs such as the Open CDN platform. FIG. 13 illustrates various components of the log reporting system 1310 in accordance with some embodiments. The log reporting system 1310 includes one or more of a log aggregator 1320, data store 1325, splitter 1330, management agent 1340, archival storage 1350, dissemination agent 1360, log analyzer 1370, and portal 1380. Some or all of these components 1320-1380 are embodied as software applications or processes that execute on one or more physical computing devices. Collectively, the components 1320-1380 transform general purpose computing resources of the computing devices to implement and perform the log reporting and derived usage functionality that is described herein. In other words, the computing devices on which the log reporting system 1310 executes comprise general purpose processors, random access memory, non-volatile storage, and network resources that are transformed by the components 1320-1380 into one or more specific purpose machines for performing the log reporting and derived usage functionality that is described herein. In some embodiments, the log reporting system 1310 is part of or integrated with the Open CDN server that is described in Section IV below. In some other embodiments, the log reporting system 1310 is a system that operates independent of the other Open CDN platform components.

In some embodiments, the log aggregator 1320 aggregates server logs from the OCDNPs. Depending on the integration framework for the log reporting system 1310 in the Open CDN platform, the log aggregator 1320 may aggregate logs from the servers of the different OCDNPs or from existing reporting systems of the OCDNPs where the existing reporting systems of the OCDNPs may be part of or integrated with the administrative servers described above. Different integration frameworks are presented below with reference to FIGS. 16-21. Irrespective of the integration framework, the log aggregator 1320 aggregates the server logs periodically (e.g., every fifteen minutes) using a push or pull mechanism. When pulling the server logs, the log aggregator 1320 is configured with the addressing and necessary authorization to retrieve the server logs from each of the servers of the OCDNPs. In some embodiments, pulling the server logs involves accessing memory or storage of the servers to obtain the server logs using a secure connection or a file transfer protocol (i.e., FTP). In some embodiments, pulling the server logs involves issuing a request for one or more logs of a server, to which the server responds by passing the requested logs. When receiving pushed server logs, the servers are configured with the address of the log aggregator 1320 and the servers periodically pass the logs to the log aggregator 1320. In some embodiments, the server logs are compressed before being transferred from the servers to the log aggregator 1320. In some embodiments, the connector agents integrated with each OCDNP provide the interface that enables the log aggregator 1320 to aggregate the server logs. In some such embodiments, the log aggregator 1320 communicably couples to the connector agents of the OCDNPs and each connector agent establishes the interface to the servers or native reporting system of a particular OCDNP. The log aggregator 1320 then uses the established interface to aggregate the server logs from that particular OCDNP. It should be apparent however that the log aggregator 1320 may perform the server log aggregation without the assisted operation of the connector agents and the aggregation may be performed by directly coupling to the servers or the reporting system of the various OCDNPs.

Each aggregated server log enumerates the transactions that were performed by a particular server for the customer configurations that are deployed to that particular server. The transactional entries in the logs specify various identification parameters, performance parameters, and error conditions that occur during the time interval between when the server's logs were last aggregated. A single transactional log entry may specify a customer identifier, a timestamp, Internet Protocol (IP) addressing for who the requestor was, what file was requested, what application and version submitted the request, and how long it took to deliver the content as some examples.

Depending on the OCDNP integration framework with the Open CDN platform, the transactional log entries may conform to an Open CDN specified log standard or a native OCDNP standard. For example, when a particular OCDNP is not integrated with the connector agent and the Open CDN API, the aggregated logs from that particular OCDNP may contain customer identifiers, formatting, parameters, etc. that are specific to the particular OCDNP and that are potentially incompatible with the customer identifiers, formatting, parameters, etc. of other OCDNPs. In such cases, the log aggregator performs log standardization to ensure uniformity and consistency across the logs aggregated from the different OCDNPs. These processes are described below. However, when a particular OCDNP is integrated with the connector agent and the connector agent is communicably coupled to the Open CDN API, the aggregated logs will instead contain the OCDN_CID (i.e., Open CDN customer identifiers) as well as formatting, parameters, etc. that conform to an Open CDN log standard. This may occur as a result of the connector agent using the Open CDN API to map from the native customer identifiers, formatting, parameters, etc. to the Open CDN log standard during log aggregation. This may also occur without the need of the connector agent and/or Open CDN API performing the mapping during aggregation when the OCDNPs agree to the Open CDN log standard in advance and reconfigure their servers to automatically produce logs according to the Open CDN log standard.

The log aggregator 1320 stores the aggregated logs to the data store 1325. In the Open CDN platform or other federation, the aggregated server logs may include entries that specify transactions for customers that are native or foreign to the OCDNP from which the server logs were aggregated.

Figure 14:
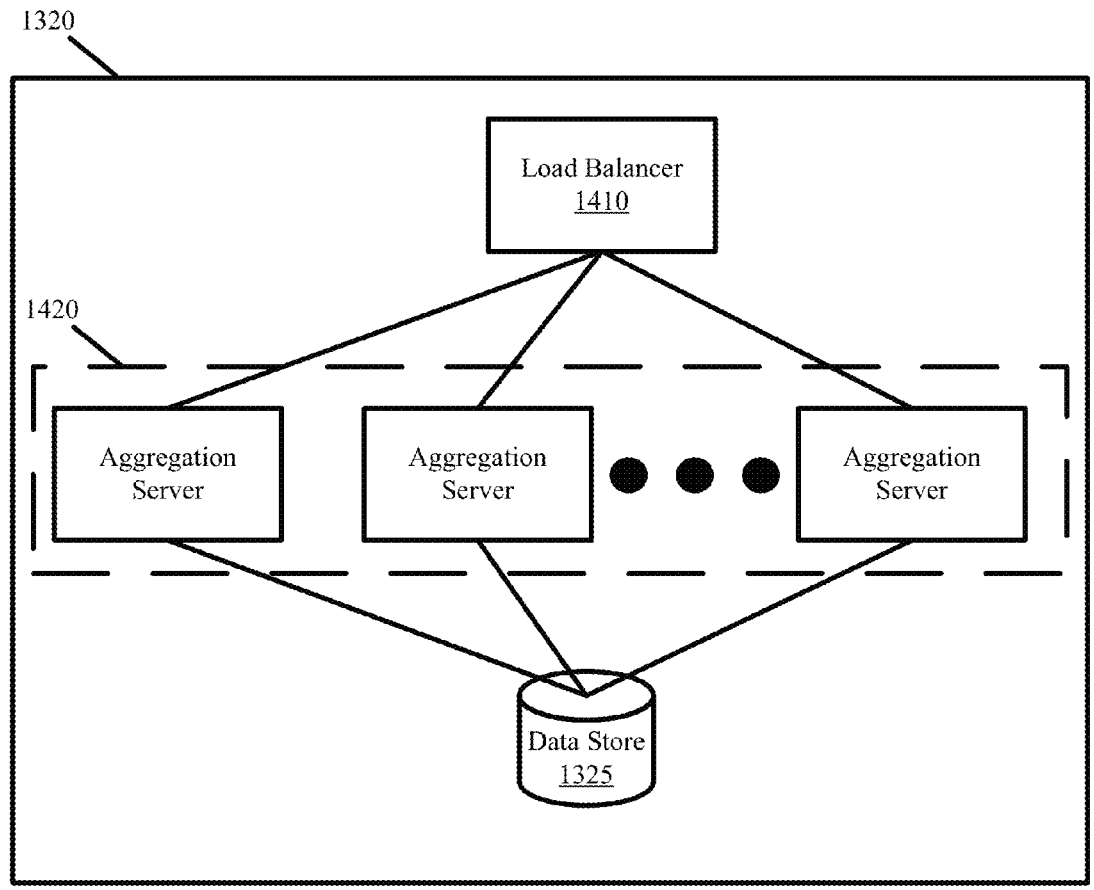
FIG. 14 illustrates a distributed structure for implementing the log aggregator in accordance with some embodiments.

Due to the volume of logs that are aggregated in the federation, some embodiments implement the log aggregator 1320 with a distributed structure. One such structure for the log aggregator 1320 is presented in FIG. 14. As shown, the log aggregator 1320 is implemented with a load balancer 1410 and a set of aggregation servers 1420 that are communicably coupled to the data store 1325. The load balancer 1410 initially receives the server logs from the OCDNPs. The load balancer 1410 distributes the server logs across the set of aggregation servers 1420. The load balancer 1410 may utilize a round-robin distribution algorithm or a more complex distribution algorithm to distribute the server logs across the set of aggregation servers 1420. For example, each of the aggregation servers 1420 may be tasked with aggregating server logs for a particular service or a particular server type wherein server logs for streaming Adobe Flash based content are passed to a first aggregation server, server logs for delivery of HTTP content are passed to a second aggregation server, and server logs for delivery of dynamic content are passed to a third aggregation server.

In some embodiments, the log aggregator 1320 (including the set of aggregation servers 1420) performs an audit process to ensure that the server logs are aggregated from the proper set of servers. The audit process includes the log aggregator 1320 intermittently requesting "data crumbs" or other objects (e.g., beacon objects or token objects) from the servers. The log aggregator 1320 internally records what crumbs or objects were requested. Upon aggregating the server logs, the log aggregator 1320 confirms that the requested data crumbs or objects appear as transactional entries in the logs. An incomplete or partially aggregated server log is identified when one or more data crumbs or objects requested are not found as transactional entries in the log. A missing server log is identified when a log has not been aggregated from a server to which one or more data crumbs or object requests were submitted. A complete server log is identified when all data crumbs or object requests are included within an aggregated log file.

Another task that may be performed by the log aggregator 1320 is log filtering. Log filtering is performed when the log reporting system is only concerned with aggregated logs from specific servers or for specific customer configurations. This may be case when the log reporting system performs log reporting for customer configurations that are deployed from a native OCDNP to a foreign OCDNP and existing log reporting systems of the OCDNP perform log reporting for customer configurations that are wholly deployed to a native OCDNP. As part of log filtering, the log aggregator 1320 scans the aggregated logs to extract and retain in the data store 1325, log entries from a specified set of servers that are of interest or for a specified set of customer configurations that are of interest. Other log entries are discarded or removed from the data store 1325 to reduce the processing that the splitter 1330 performs.

Still another task that may be performed by the log aggregator 1320 is log standardization. The log aggregator 1320 performs log standardization to ensure some level of uniformity and consistency across the server logs aggregated from the different OCDNPs. Since each OCDNP is independently operated, it may be the case that the servers for one OCDNP utilize native customer identifiers that are different than native customer identifiers used by a different OCDNP. For example, OCDNP_A may internally identify a particular customer with the native identifier 1234. When OCDNP_A deploys a configuration of the particular customer to OCDNP_B, OCDNP_B may use its own native identifier ABCD to track and monitor the particular customer's configuration. As a result, the logs produced by servers of OCDNP_B will contain the ABCD customer identifier that then needs to be converted back to the 1234 customer identifier used by OCDNP_A. Otherwise, OCDNP_A will be unable to associate the log entries with the proper customer when the logs are reported from OCDNP_B to OCDNP_A. Accordingly as part of log standardization, the log aggregator 1320 may convert the customer identifiers as well as formatting, parameters, etc. to an Open CDN specified log standard. The rule definitions and translations between the native OCDNP identifiers, formats, parameters, etc. and the Open CDN log standard are defined in the Open CDN API. Accordingly, the log reporting system 1310, and more specifically, the log aggregator 1320 of some embodiments are communicably coupled to the Open CDN API. The OCDNPs can then utilize the logs in the Open CDN log standard or convert back to their native identifiers, formatting, parameters, etc. by a mapping operation that can be performed using the connector agent and Open CDN API integrated with the OCDNP. However, it is anticipated that as a condition to becoming an Open CDN participant, that the OCDNPs agree to comply with the Open CDN log standard whether by the connector agent and Open CDN API or by reconfiguring their native servers to automatically produce server logs per the Open CDN log standard.

In some embodiments, the splitter 1330 is a process that continually or periodically runs as new server logs are aggregated and entered to the data store 1325. The splitter 1330 is tasked with regrouping the log entries in the aggregated server logs on a per customer basis irrespective of which servers of which service providers produced the logs. In other words, the splitter 1330 produces a set of customer logs where each customer log contains log entries for transactions involving a particular customer as opposed to the aggregated server logs that contain the transactions that were performed by a particular server for the customer configurations that are deployed to that particular server.

Figure 15:
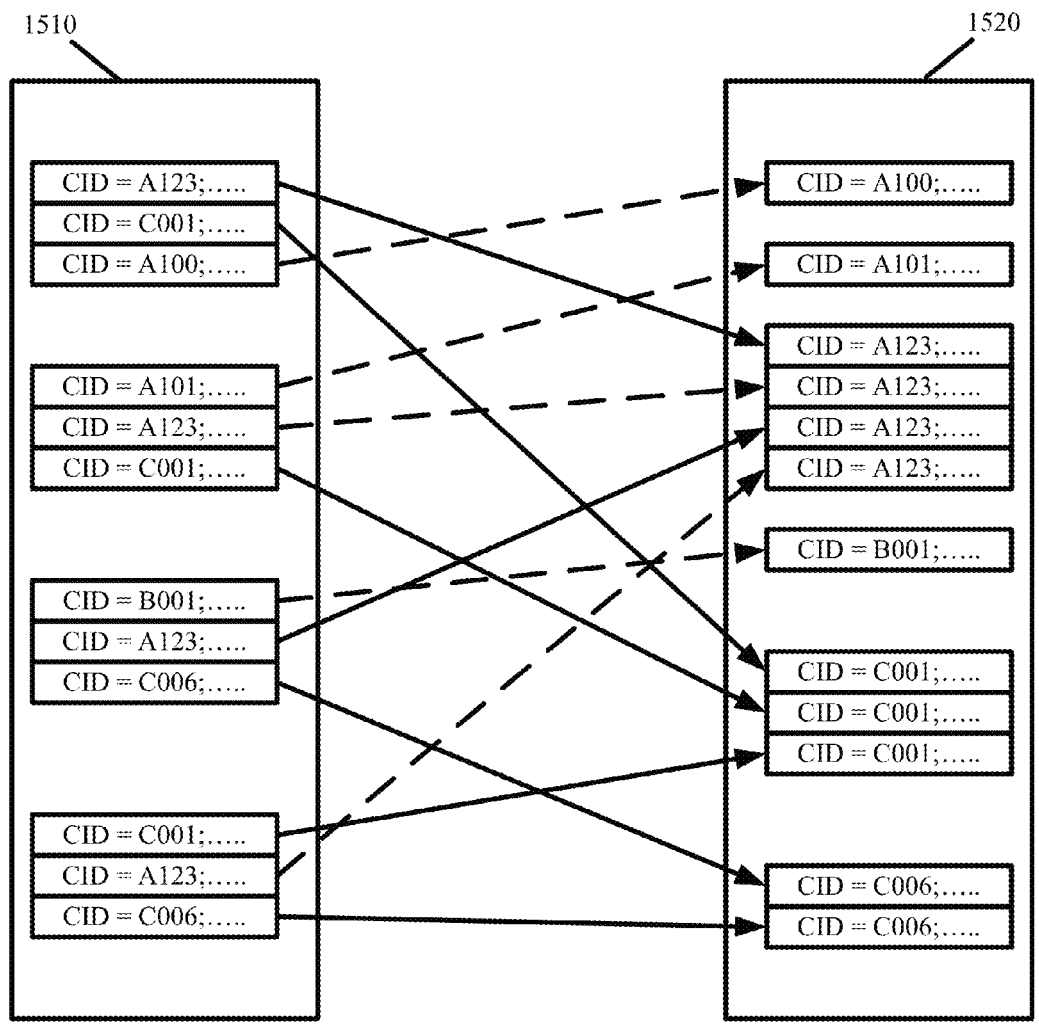
FIG. 15 conceptually illustrates the regrouping performed by the splitter in accordance with some embodiments.

FIG. 15 conceptually illustrates the regrouping that is performed by the splitter 1330 in accordance with some embodiments. The left side of the figure 1510 conceptually depicts server logs that have been aggregated from servers of the federation and that have been entered to the data store 1325. The right side of the figure 1520 conceptually depicts customer logs that the splitter 1330 produces based on the regrouping of the log entries of the aggregated server log. Specifically, the left side 1510 depicts four server logs, each with three entries, and each entry specifying at least a customer identifier. The right side 1520 depicts six customer logs that each comprise entries for the same customer identifier and that were produced as a result of the splitter 1330 reordering the entries of the server logs.

In some embodiments, the splitter 1330 processes the aggregated server logs by accessing the data store 1325, opening each newly aggregated server log, performing an entry by entry analysis of the server log to identify a customer identifier to which the log entry relates, and for each customer identified log entry, the splitter appends the log entry to the appropriate customer log that is also stored in the data store

1325. In some embodiments, customer logs are identified with the Open CDN customer identifiers to conform with the customer identifiers in the logs aggregated and standardized by the log aggregator 1320. When a customer log for a customer identifier does not exist, the splitter 1330 generates a new customer log. The splitter 1330 may delete aggregated logs from the data store 1325 when processing of the server logs is complete. Alternatively, the splitter 1330 may set a flag or otherwise mark the server logs as having been processed. In this manner, a single customer log may include aggregated entries produced by servers of different OCDNPs such that the customer need only access that single log to obtain detailed information regarding a configuration that was deployed to multiple OCDNPs.

In some embodiments, the splitter 1330 sets a flag for the customer logs that are updated with new log entries. The flags identify for the management agent 1340 which customers have newly aggregated log entries. The management agent 1340 contains rules that determine what tasks the archival storage 1350, the dissemination agent 1360, and the log analyzer 1370 are to perform for the new log entries. In some embodiments, the rules are specified according to customer preferences or OCDNP preferences. Such preferences can be set using the portal 1380 of the log reporting system 1310. In some embodiments, the rules are specified by an administrator of the Open CDN platform. The preferences specify whether a customer will be (1) provided archived access to its customer logs, (2) provided direct delivery of its customer logs when those logs become available, (3) provided access to processed log data that include performance and analytics, and (4) provided billing information based on customer logs.

By controlling the operation of the archival storage 1350, the dissemination agent 1360, and the log analyzer 1370, the management agent 1340 reduces the overhead for each of the components and allows the log reporting system to better scale for federated platforms. Specifically, other log reporting systems for smaller platforms may unnecessarily archive logs, deliver logs, and process logs when the customer is only interested in one of three functions. Through the management agent 1340, the log reporting functionality can be customized on a per customer basis such that user specified logs are archived or delivered and custom performance reports and analytics are produced on a per customer basis.

To specify tasks for the archival storage 1350, the dissemination agent 1360, and the log analyzer 1370, the management agent 1340 identifies which customers have new log entries grouped by the splitter. Then, the management agent 1340 identifies rules that have been specified for those customers. Based on the specified rules, the management agent 1340 defines tasks that are to be performed for one or more of the components 1350, 1360, and 1370. In some embodiments, the tasks are issued to the respective component. In some embodiments, each of the archival storage 1350, the dissemination agent 1360, and the log analyzer 1370 periodically query the management agent 1340 to see if there are new tasks to be performed.

In some embodiments, the archival storage 1350 is tasked with long term storage of customer logs as well as derived performance and analytics which are produced by the log analyzer 1370 (discussed below). When the management agent 1340 specifies a task for the archival storage 1350, the task identifies a customer identifier and logs for that customer that are to be archived. Next, the archival storage 1350 retrieves the newly entered log entries for the identified customer from the data store 1325 and stores the log entries in long term storage. In some embodiments, the archival storage 1350 appends the retrieved log entries to existing customer logs in the long term storage. In some embodiments, the archival storage 1350 stores newly retrieved log entries as separate customer logs in the long term storage. The long term storage may include any of a data structure, file, or database. Customer logs in the long term storage are available for subsequent retrieval by the corresponding customer through the portal 1380. Additionally, the reporting systems of the OCDNPs may access the portal 1380 on behalf of a customer to retrieve archived customer logs in an on-demand basis. In some embodiments, the archival storage 1350 stores a second copy of the customer logs for Open CDN administration purposes. The second copy may include additional log entries that are particular to Open CDN operation and that are otherwise not available to the customers.

As noted above, the archival storage 1350 also may be tasked with storage of performance parameters and analytics produced by the log analyzer 1370. In such cases, the archival storage 1350 waits for the log analyzer 1370 to process the customer logs and pass the processed data to the archival storage 1350 so that they be properly stored to the long term storage in addition to or instead of the customer logs. In this manner, the logs for any customer OCDNP of the Open CDN platform are available at the archival storage 1350.

In some embodiments, the dissemination agent 1360 is tasked with delivering customer logs directly to the customers. This may include delivery of the derived performance reports and analytics that are produced by the log analyzer 1370 (discussed below). The dissemination agent 1360 queries the management agent 1340 to determine whether new log entries have been aggregated and grouped for a customer that is associated with a rule for direct delivery of those customer logs. When such a rule is identified, the dissemination agent 1360 obtains the identifier for the customer and the dissemination agent 1360 retrieves the customer log(s) from the data store 1325 using the customer identifier. The dissemination agent 1360 may also use the customer identifier to retrieve performance reports and analytics from the log analyzer 1370 if specified. The dissemination agent 1360 then directly delivers the customer logs, performance reports, and/or analytics to the customer using a secure connection or a file transfer protocol (i.e., FTP).

In some embodiments, the log analyzer 1370 is tasked with producing performance reports, analytics, and billing information for the customers of the OCDNPs based on the transactional entries in the customer logs. Different rules may be specified for different customers in the management agent 1340 and depending on the rules, the log analyzer 1370 may produce different performance reports and analytics for different customers.

The performance reports produced by the log analyzer 1370 contain similar performance parameters to the reports produced by other log reporting systems. Some such performance parameters include throughput, hits per second, bytes served, requests processed, stream and live feed information, etc. However, the key distinction is that the performance reports produced by the log analyzer 1370 incorporate log entries from servers of different OCDNPs such that the resulting performance parameters comprehensively and accurately portray the realized performance for a customer configuration that is deployed to at least one foreign OCDNP. Other log reporting system are incapable of producing reports for configurations that are deployed to foreign OCDNPs as they do not include the mechanisms that allow inter-CDN communication (i.e., identifiers and APIs), are unable to aggregate logs from servers of the foreign CDN, and lack sufficient resources to perform processing for configurations of a federated platform such as the Open CDN platform.

In some embodiments, the analytics identify error conditions and other status for the customer configuration across the different servers of the different OCDNPs to which it is deployed. Analytics may include the number of times a certain file or object was requested, the number of times download for a file or object was interrupted, number of 20X (e.g., 200, 201, 202, etc.) status codes, 40× status codes, etc. In addition, the customer logs may be used for operational aspects of the Open CDN platform such as the management of traffic between OCDNPs, monitoring of service levels, load and capacity feedback, and other operations necessary for the OCDNPs to operate in a cohesive manner.

As with the performance parameters above, the difference in the reported analytics of the log reporting system of some embodiments versus other reporting systems is that the log reporting systems of some embodiments are able to produce analytics for a customer configuration that is deployed to servers of multiple OCDNPs. Such reporting allows a customer to better manage large scale configurations by identifying where errors or bottlenecks occur and where additional capacity should be deployed through a single interface or a single set of analytics or a single report. Such reporting of federated configurations goes hand-in-hand with the dynamic and potentially limitless capacity scaling that is afforded by the Open CDN platform. Specifically, wherever the customer identifies a need for additional capacity based on the performance parameters and analytics produced by the log reporting system, that capacity can be obtained through the Open CDN platform irrespective of which OCDNP actually provides the capacity.

In some embodiments, the customer logs are used for billing or chargeback purposes for an OCDNP or OCDNP customer even when the configuration of the customer is deployed across different OCDNPs. OCDNPs receiving the customer logs can determine how much capacity a customer used on native and foreign OCDNPs and bill that customer accordingly. The customer may also be charged for different amounts of capacity that were reserved for that customer, but that were not used during a billing cycle. Additionally, OCDNPs can utilize the customer logs for billing other OCDNPs. This occurs when a first OCDNP deploys a configuration for a customer of a second OCDNP and the first OCDNP bills the second OCDNP for capacity used in deploying the configuration for that customer.

In some embodiments, the portal 1380 is the interface with which customers of the OCDNPs can access current or archived logs, performance reports, and analytics. In some embodiments, the customers of the OCDNPs directly interface with the portal 1380. In some embodiments, the OCDNPs provide their own portals that redirect the customers to the portal 1380 of the log reporting system 1310.

Various integration frameworks for the log reporting system 1310 with the Open CDN platform will now be described with reference to FIGS. 16-21. The functionality for the components 1320-1380 is as described above, however some integration frameworks render functionality for some of the components 1320-1380 optional and therefore the optional components may be omitted from the log reporting system in such integration frameworks.

Figure 16:
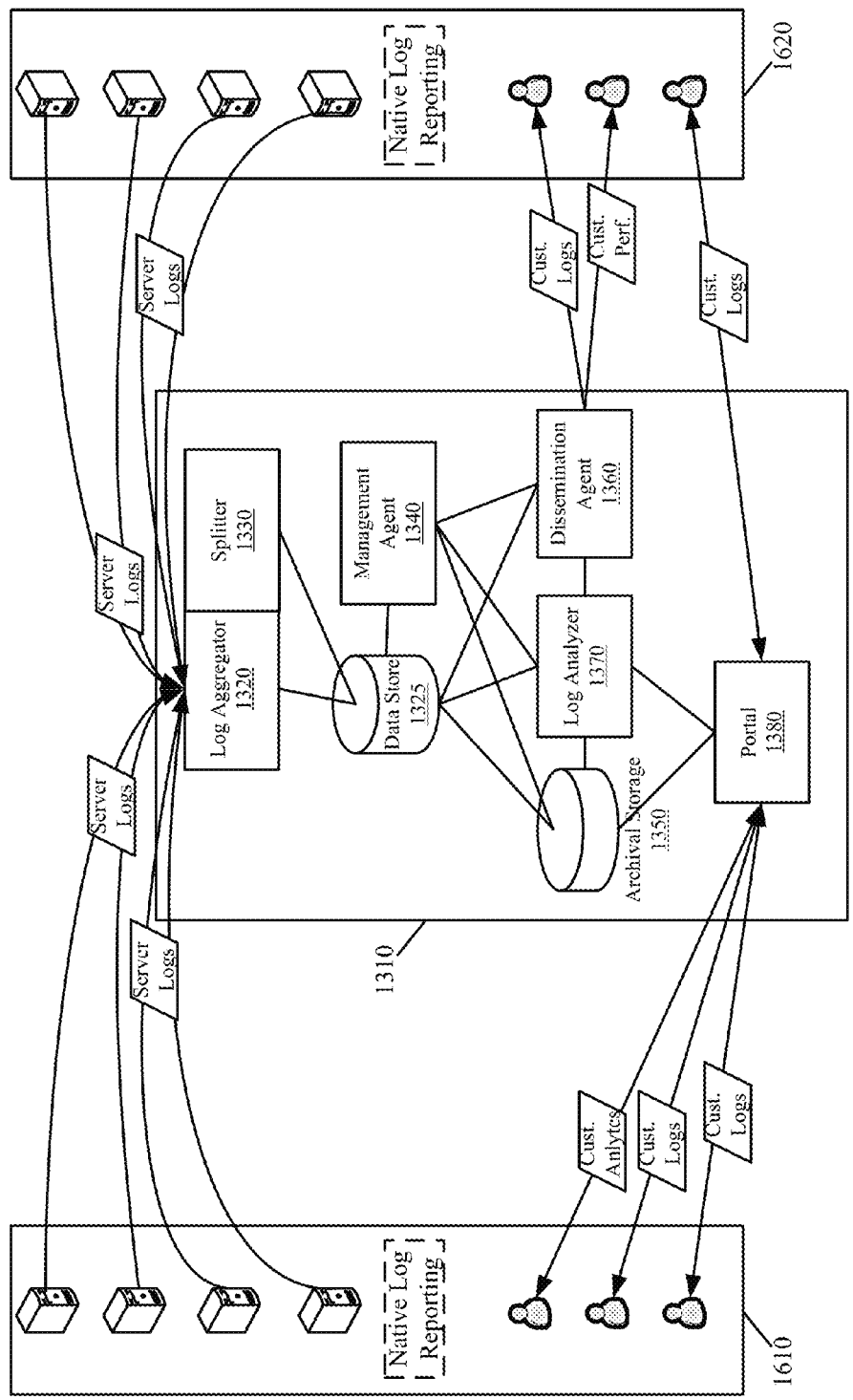
FIGS. 16-20 illustrates various centralized framework for integrating the log reporting system with the OCDNPs of the Open CDN platform in accordance with some embodiments.

FIG. 16 illustrates the log reporting system 1310 as a centralized log reporting facility for multiple OCDNPs of the Open CDN platform in accordance with some embodiments. Specifically, the figure illustrates two OCDNPs (i.e., 1610 and 1620) that include edge servers, an optional native log reporting system, and customers. It should be apparent that even though only two OCDNPs are shown in FIG. 16 for purposes of simplicity, the log reporting system 1310 can be scaled to support additional OCDNPs.

In the integration framework of FIG. 16, the log aggregator 1320 aggregates the server logs from the servers of the OCDNP 1610 and 1620. In so doing, the log reporting functions for the OCDNPs 1610 and 1620 are offloaded to and provided by the log reporting system 1310. The OCDNPs no longer need to maintain an independent log reporting system natively.

By aggregating the server logs for the OCDNPs 1610 and 1620 centrally at the log reporting system 1310, log entries for any customer configuration that is deployed to two or more OCDNPs or to a foreign OCDNP will be available at the log reporting system 1310 such that the customer logs produced by the splitter 1330 contain comprehensive and accurate log entries for the entirety of the customer configurations. The centralized integration of the log reporting system 1310 also enables the system 1310 to provide the reporting functions for the OCDNPs 1610 and 1620. Specifically, the log analyzer 1370 produces the comprehensive and holistic performance reports and analytics for the customers of the OCDNPs irrespective of which servers of which OCDNPs produced log entries for those customers. The archival storage 1350 provides the long term storage for the customer logs, derived performance reports, and analytics for the various customers of the OCDNPs 1610 and 1620. Similarly, the dissemination agent 1360 automatically delivers the customer logs, derived performance reports, and analytics to the customers of the OCDNPs that requested such data to be automatically delivered. The customers of the OCDNPs 1610 and 1620 can directly access the portal 1380 to access the customer logs, performance reports, and analytics. Alternatively, the customers of the OCDNPs 1610 and 1620 may access portals or log reporting systems of the OCDNPs 1610 and 1620 which then redirect or forward the customers to the portal 1380 of the log reporting system 1310.

As noted above, the integration framework of FIG. 16 allows the OCDNPs to offload the log reporting function to the Open CDN platform and more specifically, to the log reporting system 1310 of some embodiments. Moreover, the log reporting system 1310 provides comprehensive and holistic log reporting for the customers of the OCDNPs 1610 and 1620 irrespective of which servers of which OCDNPs the customers' configurations are deployed to.

Figure 17:
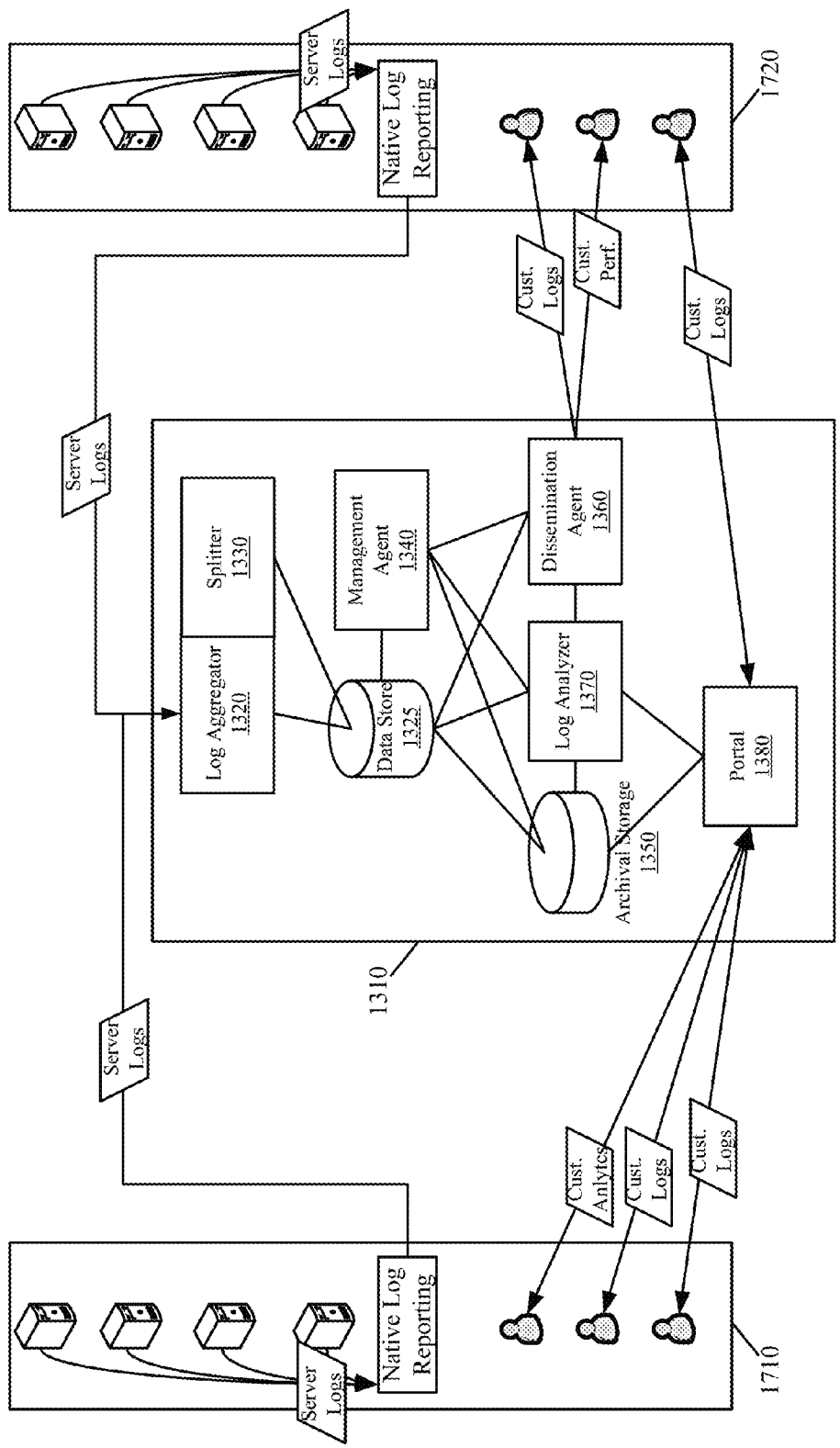

FIG. 17 illustrates another centralized framework for integrating the log reporting system 1310 with the OCDNPs of the Open CDN platform in accordance with some embodiments. The integration framework of FIG. 17 includes the log reporting system 1310 of some embodiments and OCDNPs 1710 and 1720. However in contrast to FIG. 16 above, each native log reporting systems of the OCDNPs 1710 and 1720 aggregates server logs from the servers of the respective native OCDNP. The log aggregator 1320 then aggregates the server logs from the native log reporting systems. This integration framework minimizes the degree with which the OCDNPs change their infrastructure and internal configuration in order to participate in the Open CDN platform. Many such participants have some native log reporting systems already in place to aggregate server logs from their native servers. However when participating in the Open CDN platform, these server logs can contain incomplete data that does not include log entries for customer configurations that were deployed to a foreign OCDNP. Moreover, these server logs can contain log entries for foreign customers or customers that have not registered with the native OCDNP. Accordingly, the log aggregator 1320 aggregates the logs from each native log reporting system of the OCDNPs 1710 and 1720 so that a complete data set is available at the log reporting system 1310 when producing the customer logs, performance reports, analytics, and billing data. The dissemination agent 1360 and the portal 1380 can then provide the OCDNPs 1710 and 1720 and the customers of the OCDNPs 1710 and 1720 access to the customer logs, performance reports, analytics, and billing data.

Figure 18:
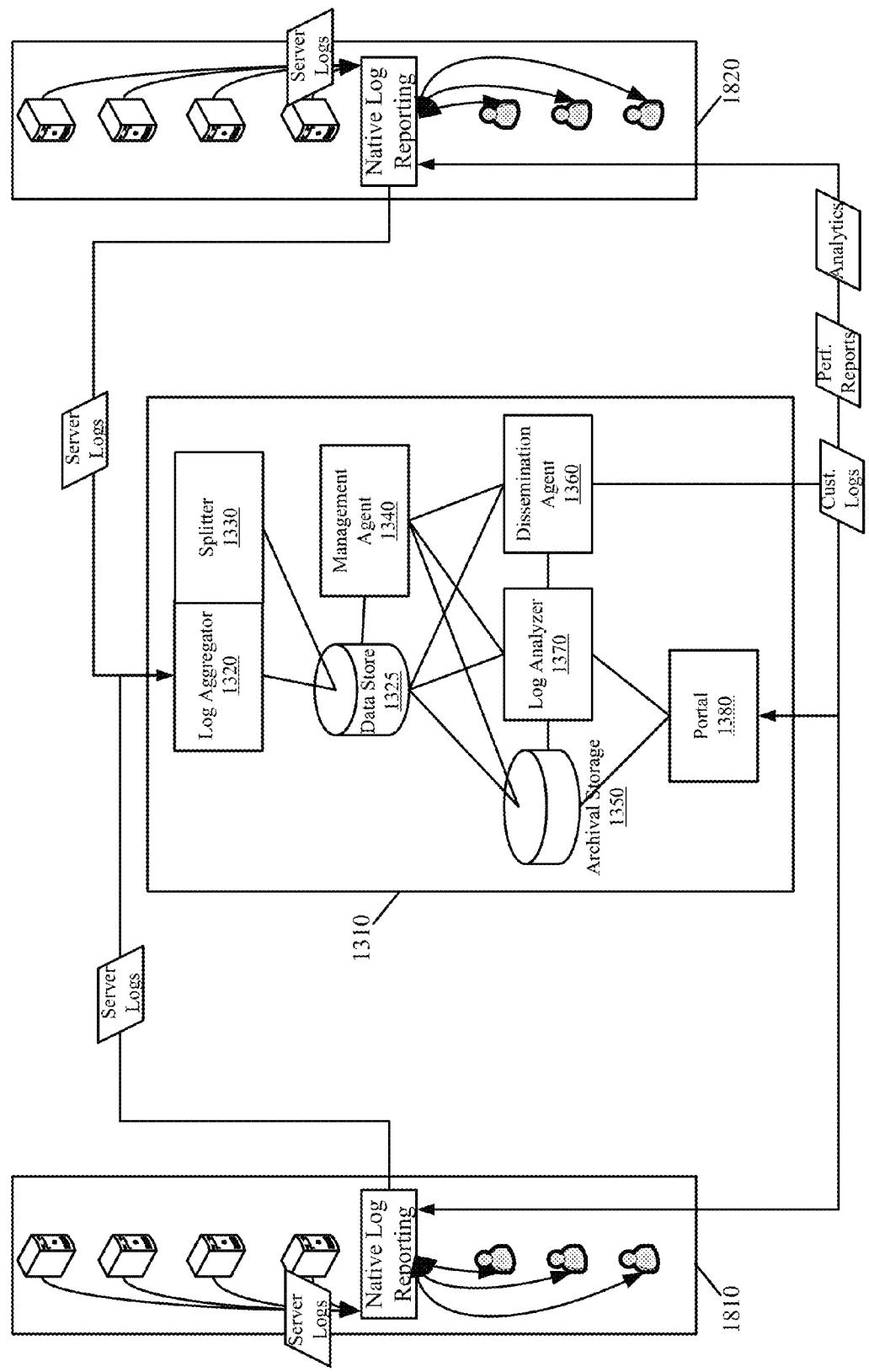

A variation of the integration framework of FIG. 17 is presented in FIG. 18. In the integration framework of FIG. 18, the customer logs, performance reports, analytics, and billing data are not directly accessible to the customers of the OCDNPs 1810 and 1820 via the log reporting system 1310 (i.e., via the dissemination agent 1360 and portal 1380). Instead, such information is proxied using a native log reporting system or portal of the OCDNPs 1810 and 1820. The data may be sent by the dissemination agent 1360 to the native log reporting systems as it becomes available. Alternatively, the native log reporting systems may on-demand query the portal 1380 for specific data as customers request such data through a portal of the native log reporting system as one example. In this manner, the OCDNPs 1810 and 1820 maintain more control of their customers and over the presentation of the log data.

Figure 19:
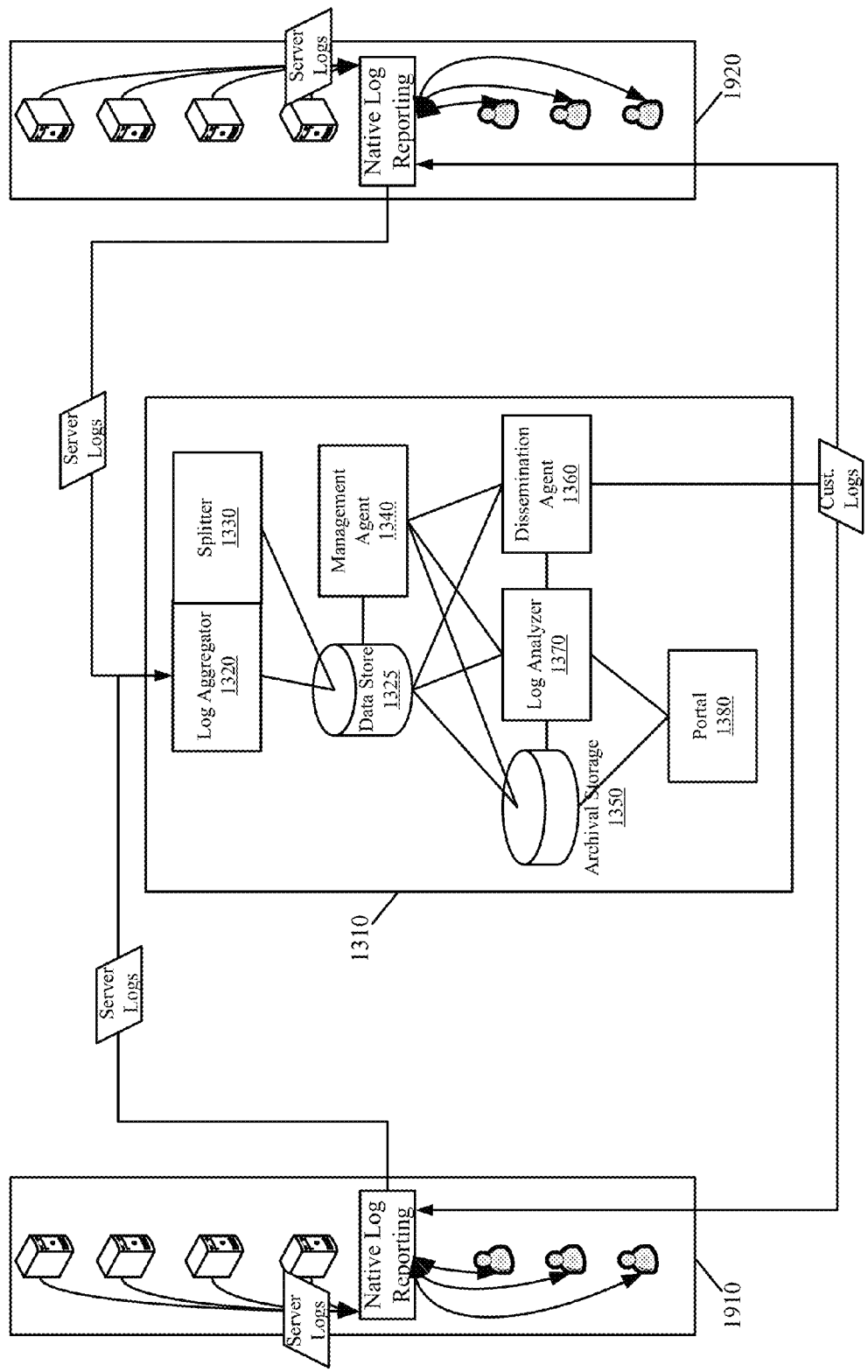

FIG. 19 illustrates using the integration framework of FIG. 18 to provide complete data sets to the OCDNPs in accordance with some embodiments. In the integration framework of FIG. 19, the log reporting system 1310 does not produce the complete customer logs, performance reports, and analytics, but offloads such functionality to the native log reporting systems of the OCNPs 1910 and 1920. However, the native log reporting systems are unable to produce such data without complete data sets including the logs that may be produced by foreign CDNSPs to which a native customer's configuration is deployed. To enable the native log reporting systems to produce such data, the log reporting system 1310 abstractly operates as another edge server that reports log data for foreign deployed customer configurations to the appropriate native OCDNP. Specifically, the log aggregator 1320 of the log reporting system 1310 aggregates the logs from the OCDNPs. Next, the splitter 1330 operates to extract log entries for a foreign customer or in other words, log entries that were reported by a foreign OCDNP when a native OCDNP deploys a customer's configuration to that foreign OCDNP. Log entries for a native customer are ignored. This is because log data for a native customer is available at the native log reporting systems of the OCDNPs 1910 and 1920 of FIG. 19 by virtue of the native log reporting systems aggregating server logs from the servers that are native to the same OCDNP as the native log reporting system. The dissemination agent 1360 then forwards the extracted customer logs to the proper native OCDNP log reporting system. The native log reporting system then combines the forwarded logs with the native aggregated logs to produce a comprehensive and holistic data set from which performance reports, analytics, and billing may be produced.

Figure 20:
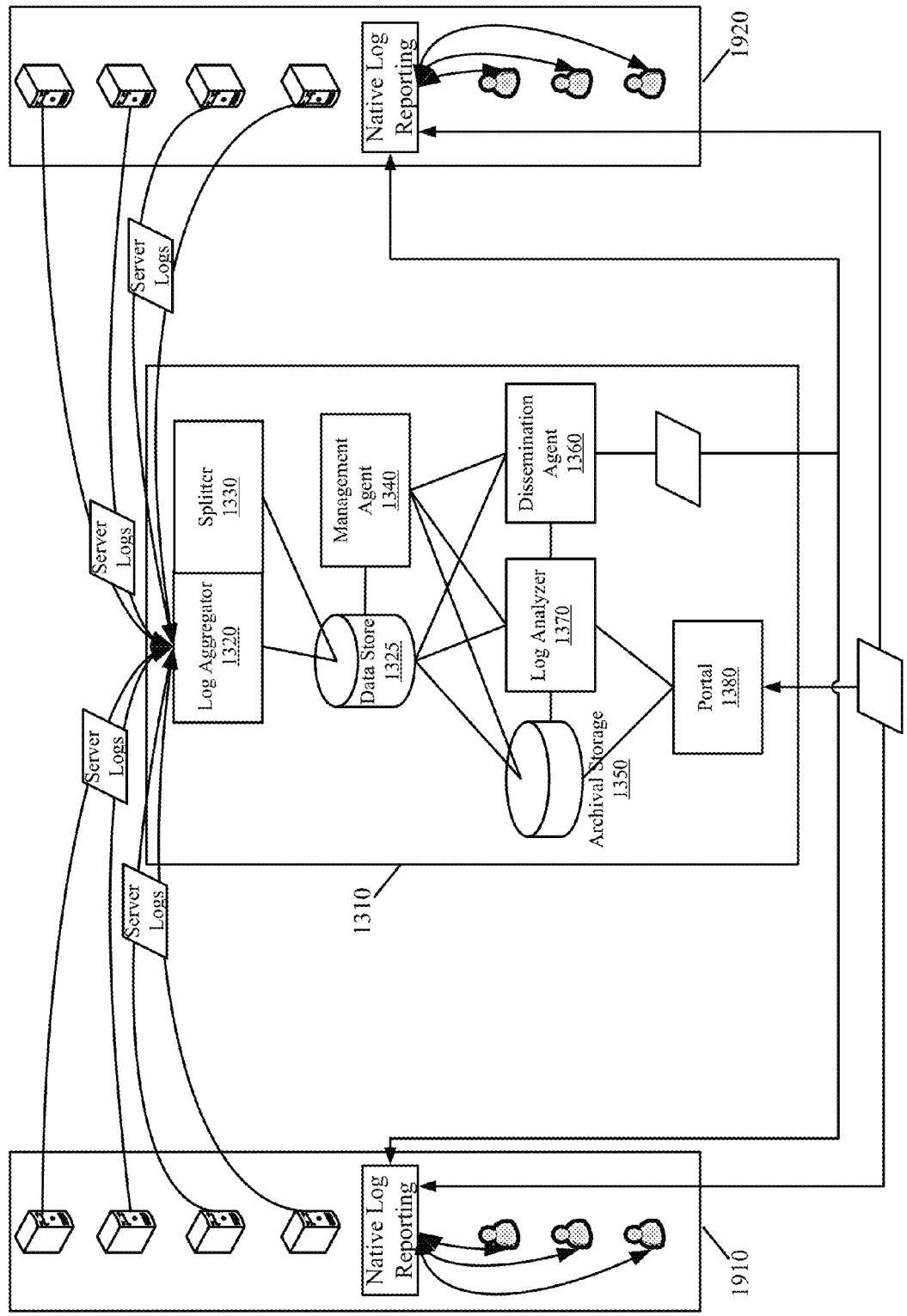

FIG. 20 illustrates another centralized framework for integrating the log reporting system 1310 with the OCDNPs of the Open CDN platform in accordance with some embodiments. This integration framework combines the aggregation functionality presented with reference to FIG. 16 with the reporting and accessibility functionality presented with reference to FIG. 18.

Figure 21:
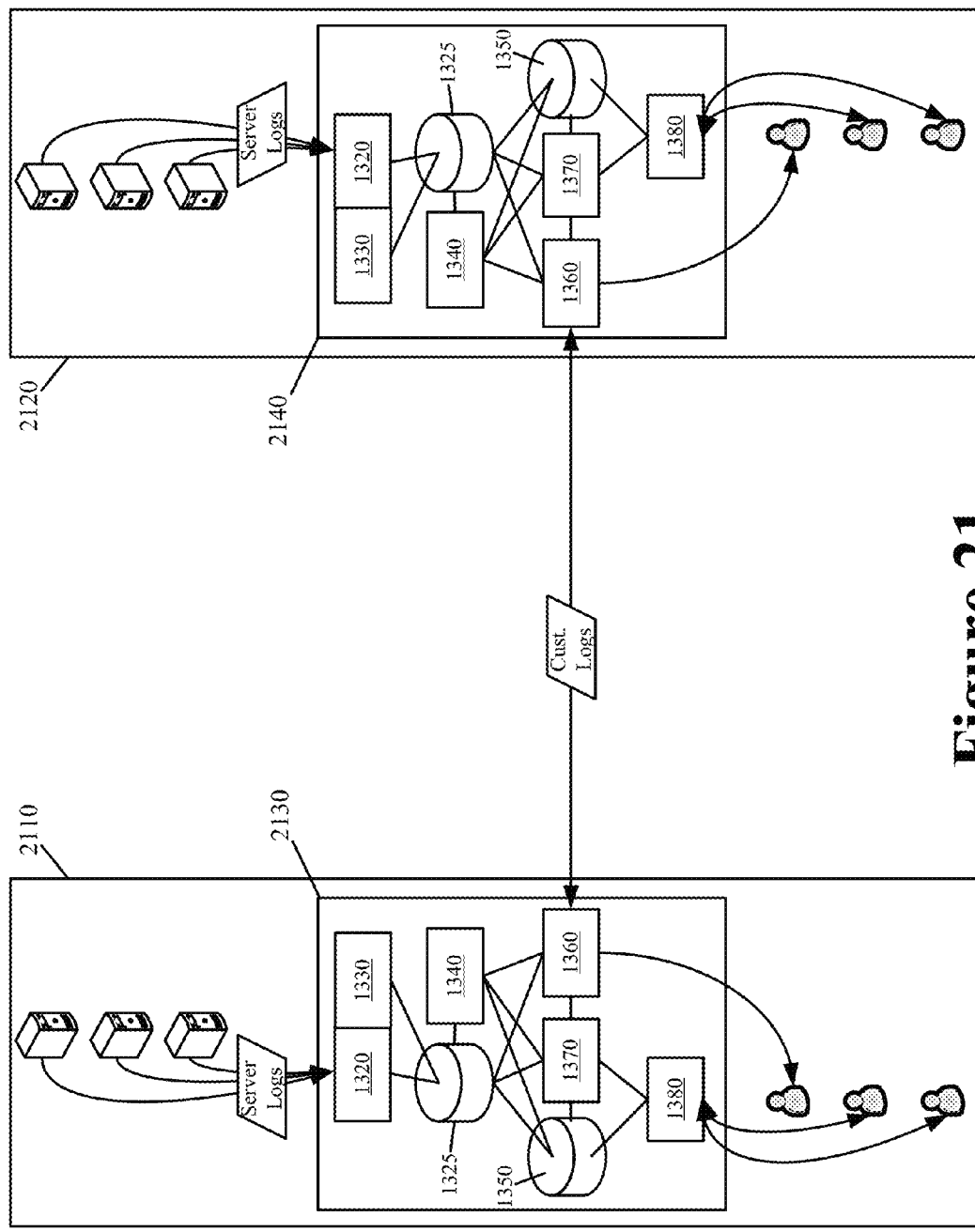
FIG. 21 illustrates a distributed integration framework for the log reporting systems that is in accordance with some embodiments.

FIG. 21 illustrates a distributed integration framework for the log reporting systems that is in accordance with some embodiments. The figure illustrates OCDNPs 2110 and 2120 and each OCDNP 2110 and 2120 is integrated with the log reporting system of some embodiments (i.e., 2130 and 2140). In this distributed framework, the log reporting system 2130 aggregates logs from the native servers of OCDNP 2110 and the log reporting system 2140 aggregates logs from the native servers of OCDNP 2120. To acquire a comprehensive and holistic data set, each log reporting system 2130 and 2140 then forwards log pertaining to a foreign deployed customer configuration back to the native OCDNP for that customer. For example, when log reporting system 2130 of OCDNP 2110 identifies a log entry for a customer of OCDNP 2120, the log reporting system 2130 forwards that log entry to the log reporting system 2140 which operates in OCDNP 2120. Each log reporting system 2130 and 2140 then provides the comprehensive and holistic customer logs, performance reports, analytics, and billing data to the native customers of the corresponding OCNDP through the log reporting system portal or dissemination agent.

In some embodiments, the dissemination agents of each log reporting system 2130 and 2140 directly deliver logs to customers that are native or foreign to the OCDNP with which the log reporting system is integrated. In this manner of operation, the logs need not be aggregated at a single log reporting system before reporting to the customer.

IV. Framework

The Open CDN platform can be implemented with different architectural frameworks. In some embodiments, the Open CDN platform is implemented as a centralized framework whereby different OCDNPs are communicably coupled to a centralized Open CDN server. In some embodiments, the Open CDN platform is implemented as a distributed framework whereby each OCDNP intercommunicates with one another without a centralized Open CDN server facilitating the communications. Each OCDNP is enhanced with a connector agent for Open CDN and inter-OCDNP communication and depending on the Open CDN framework implementation, an Open CDN API may be integrated with each OCDNP or at the Open CDN server.

Figure 22:
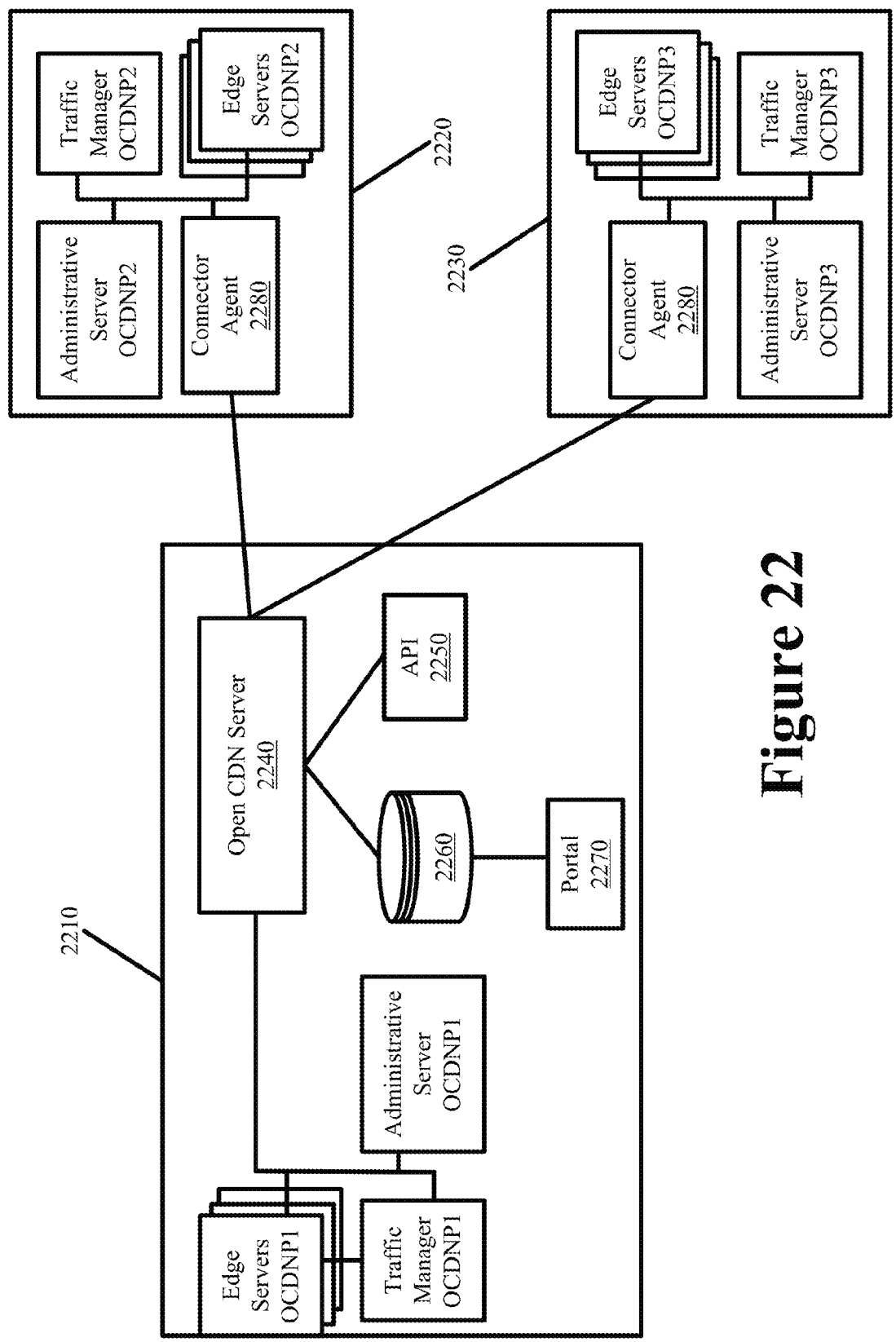
FIG. 22 illustrates a centralized framework for implementing the Open CDN platform in accordance with some embodiments.

FIG. 22 illustrates a centralized framework for implementing the Open CDN platform in accordance with some embodiments. In this centralized framework, one of several OCDNPs is designated to administer the Open CDN platform and the other OCDNPs communicably coupling to the designated OCDNP.

FIG. 22 illustrates OCDNPs 2210, 2220, and 2230. Each OCDNP 2210, 2220, and 2230 comprises at least a set of edge servers, a traffic management server, and an administrative server as described with reference to FIG. 1. It should be apparent that the OCDNPs 2210, 2220, and 2230 may be modified with other hardware and software. In this centralized framework, OCDNP 2210 is designated to administer the Open CDN platform and is enhanced with Open CDN server 2240, Open CDN API 2250, database 2260, and interface portal 2270. OCDNPs 2220 and 2230 become participants in the Open CDN platform with only minimal changes such as the inclusion of the connector agents 2280.

In some embodiments, the Open CDN server 2240 provides the capacity exchange that serves as the marketplace for the buying and selling of service instances. The Open CDN server 2240 performs the assignment of the Open CDN identifiers (e.g., OCDN_SIID, OCDN_SPID, and OCDN_CID). Additionally, the Open CDN server 2240 facilitates the allocation and configuration of service instances sold through the capacity exchange, the propagation of commands to the appropriate OCDNPs, and the collection and processing of statistical data from the OCDNPs. To do so, the Open CDN server 2240 utilizes the central Open CDN API 2250 to perform the necessary mappings that facilitate the various forms of intercommunications between OCDNP 2210 and the OCDNPs 2220 and 2230. Specifically, the Open CDN API 2250 includes the translations for mapping between the native identifiers, configurations, and statistical data of each of the OCDNPs 2210, 2220, and 2230.

The database 2260 tracks the publishing of service instances, the buying and selling of service instances, the deployment of customer configurations across OCDNPs, the assignment of identifiers, and the collected statistical data. In some embodiments, the OCDNPs 2220 and 2230 push statistical data to the Open CDN server 2240 for storage in the database 2260. In some embodiments, the Open CDN server 2240 pulls the statistical performance data from the OCDNPs 2220 and 2230 to store in the database 2260. The database 2260 is shown as a single database, however it should be apparent that the database 2260 may comprise one or more separate databases that run on one or more physical computing machines.

In some embodiments, the interface portal 2270 provides the interfaces for OCDNPs to register with the Open CDN platform, buy and sell service instances, and view the produced reports. The information provided by an OCDNP at the time of registration is stored to the database 2260. This registration information includes disclosure of the native identifiers, native configuration formats, native command formats, and native statistical formats that are needed to define the translations in the Open CDN API 2250. Such translations may be defined automatically using a set of scripts or manually by an Open CDN platform administrator.

The connector agents 2280 communicably couple the OCDNPs 2220 and 2230 to the Open CDN server 2240. In so doing, the connector agents 2280 enable the different forms of intercommunication within the Open CDN platform, two examples of which are illustrated in FIGS. 9 and 12 above. More specifically, the connector agents 2280 utilize common communication protocols and leverage the functionality of the Open CDN server 2240 and Open CDN API 2250 in order for the OCDNPs 2220 and 2230 to (1) publish their available capacity as a saleable service instance, (2) transact with the capacity exchange to receive configurations regarding the purchase of a service instance published by the OCDNP, (3) receive customer configurations from the Open CDN server 2240 for deployment to native capacity, (4) receive commands from the Open CDN server 2240 for execution using native resources, and (5) report statistical data to the Open CDN server 2240 for reporting purposes. It should be apparent that even though the connector agents 2280 are shown as separate functional components that run on separate specialized hardware within the OCDNPs 2220 and 2230, the connector agents 2280 may be modular software processes that integrate with existing components of the OCDNP, such as with the administrative server.

Figure 23:
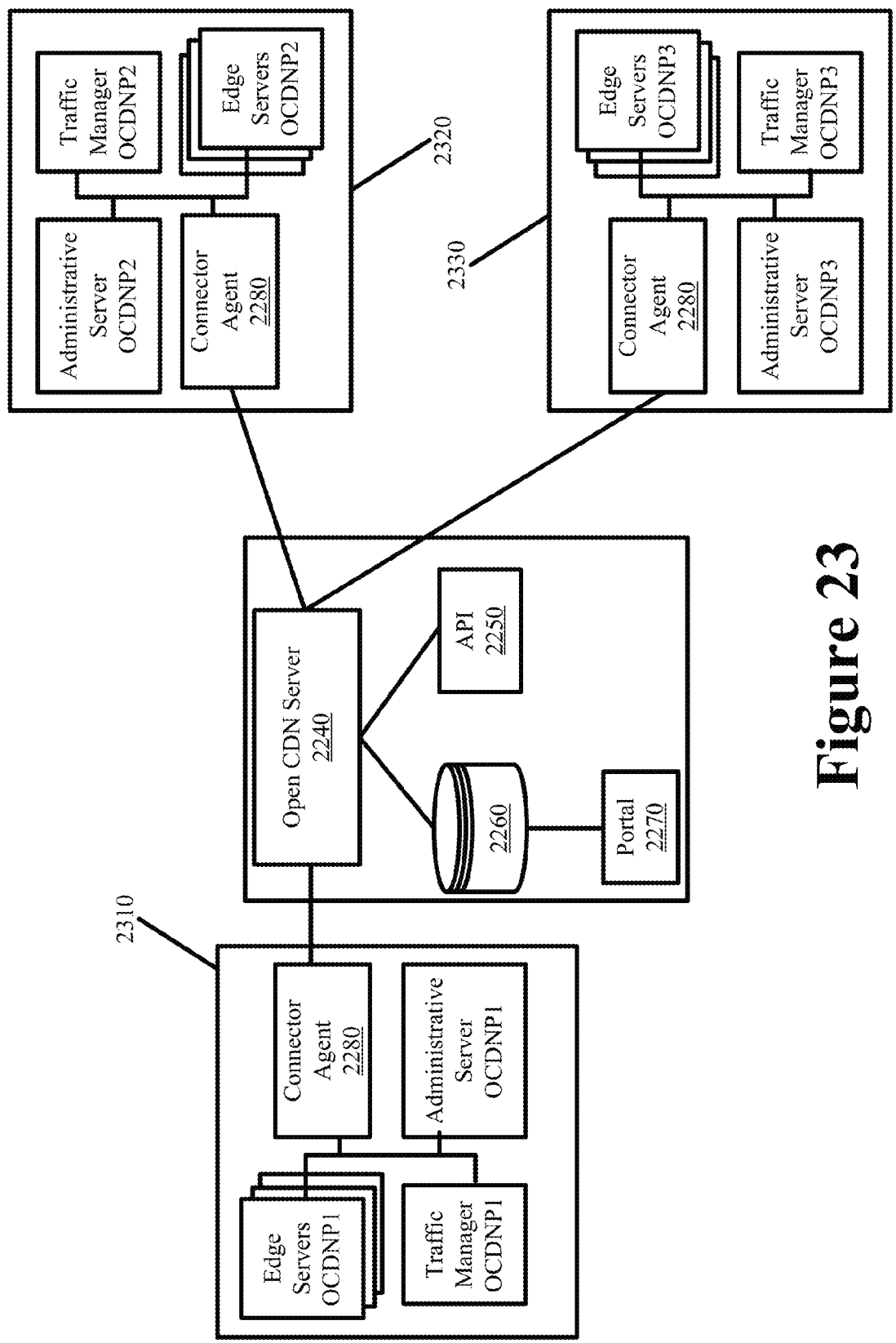
FIG. 23 presents an alternative centralized framework for implementing the Open CDN platform in accordance with some embodiments.

FIG. 23 presents an alternative centralized framework for implementing the Open CDN platform in accordance with some embodiments. In FIG. 23, a third party 2310 administers the Open CDN platform independent of the OCDNP 2320, 2330, and 2340. Specifically, the third party 2310 administers the Open CDN server 2240, the Open CDN API 2250, the database 2260, and the interface portal 2270. This framework prevents any of the OCDNPs 2320, 2330, and 2340 from having a disproportionate influence in the Open CDN platform. The operation is nevertheless the same as that described above with reference to FIG. 22 wherein each OCDNP 2320, 2330, and 2340 communicably couples to the Open CDN server 2240 using a connector agent 2380 for access to the capacity exchange and for access to services including capacity allocation, capacity configuration, command propagation, statistical data reporting, etc.

Figure 24:
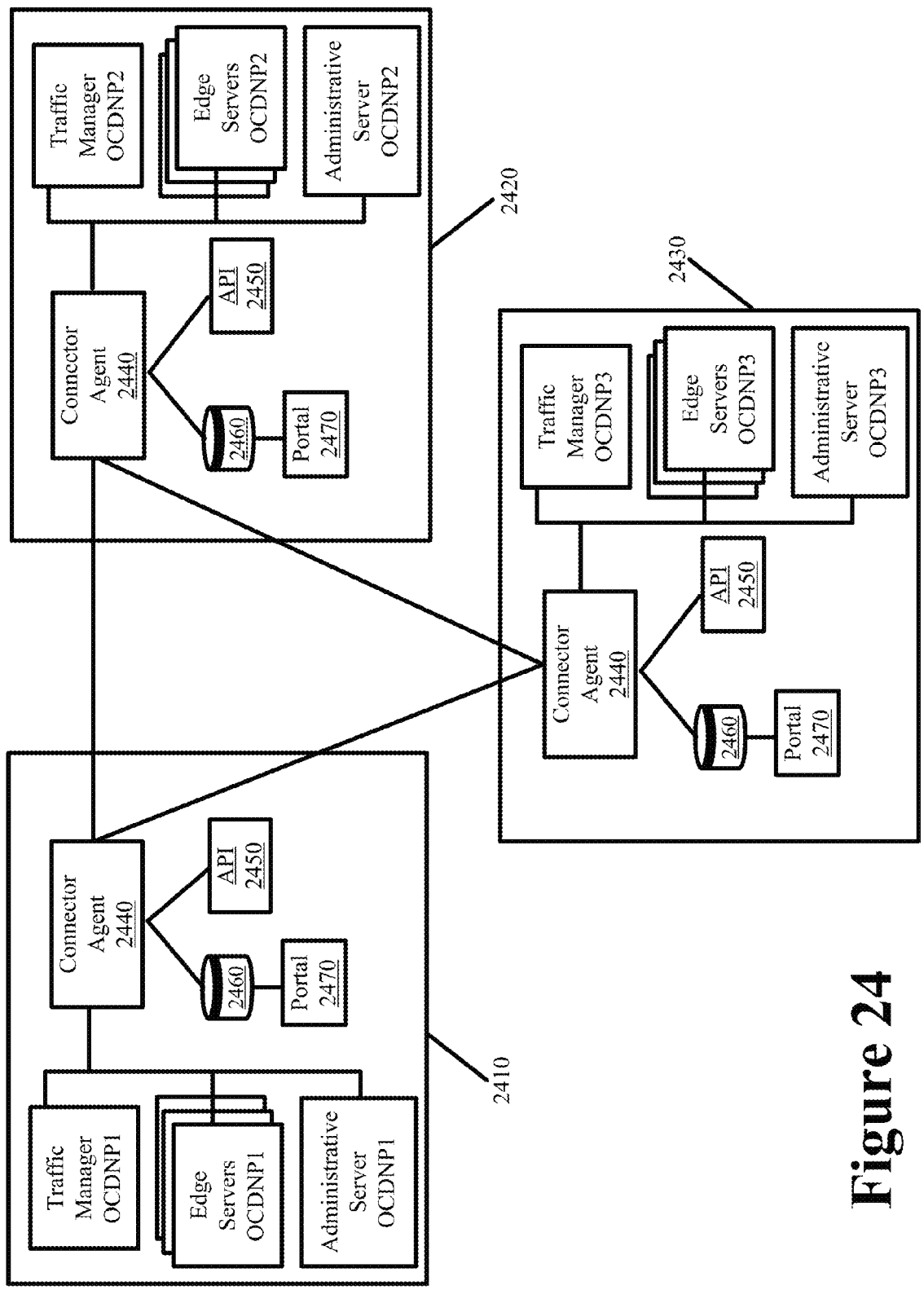
FIG. 24 illustrates a distributed framework for implementing the Open CDN platform in accordance with some embodiments.

FIG. 24 illustrates a distributed framework for implementing the Open CDN platform in accordance with some embodiments. In this distributed framework, each OCDNP 2410, 2420, and 2430 is enhanced with a connector agent 2440, Open CDN API 2450, database 2460, and interface portal 2470.

By virtue of the distributed framework, the capacity exchange is also distributed. In some embodiments, the database 2460 at each particular OCDNP stores the service instances that the particular OCDNP has published or has made available to the other OCDNPs. The connector agents 2440 then share the published service instance information with each other such that each OCDNP has knowledge of the available service instances in the Open CDN platform. Once a desired service instance is identified and a purchase offer is submitted by an OCDNP buyer, the connector agent 2440 of the OCDNP buyer conveys the purchase offer to the connector agent 2440 of the OCDNP seller and the offer can be accepted, rejected, or counter offered. In this manner, the connector agents 2440 directly broker the buying and selling of capacity in the federated Open CDN platform. In some other embodiments, the connector agents 2440 do not share the published service instance information with one another. Instead, an OCDNP buyer specifies a query for a desired service instance and the connector agent 2440 for the OCDNP buyer issues the query to the connector agents 2440 of the other OCDNPs participating in the Open CDN platform. The connector agents 2440 receiving the query scan the database 2460 to identify whether their native OCDNP has published a service instance that meets the qualifications specified in the query. When a suitable service instance is identified, the connector agent 2440 of the OCDNP seller is contacts the connector agent 2440 of the OCDNP buyer to broker the sale of the service instance.

The connector agents and the Open CDN APIs also perform the various mappings for passing configurations, commands, and statistical data inter-OCDNP. This may include performing the mappings described in FIGS. 10 and 11 whereby the connector agent and Open CDN API of a first OCDNP map native identifiers and formatting of the first OCDNP to intermediary Open CDN identifiers and formats. The connector agent of the first OCDNP then passes the Open CDN identifiers and formats to a connector agent of a second OCDNP. The connector agent and Open CDN API of the second OCDNP then remap the Open CDN identifiers and formats to the native identifiers and formatting of the second OCDNP. It should be noted that the connector agents and Open CDN APIs may be used to perform a direct mapping between the native identifiers and formats without use of the intermediary Open CDN identifiers and formats.

The database 2460 can be used to track which native configurations are deployed to which foreign OCDNPs. The database 2460 can also be used to collect statistical data via the connector agents 2440 from foreign OCDNPs for configurations deployed to those foreign OCDNPs.

Figure 25:
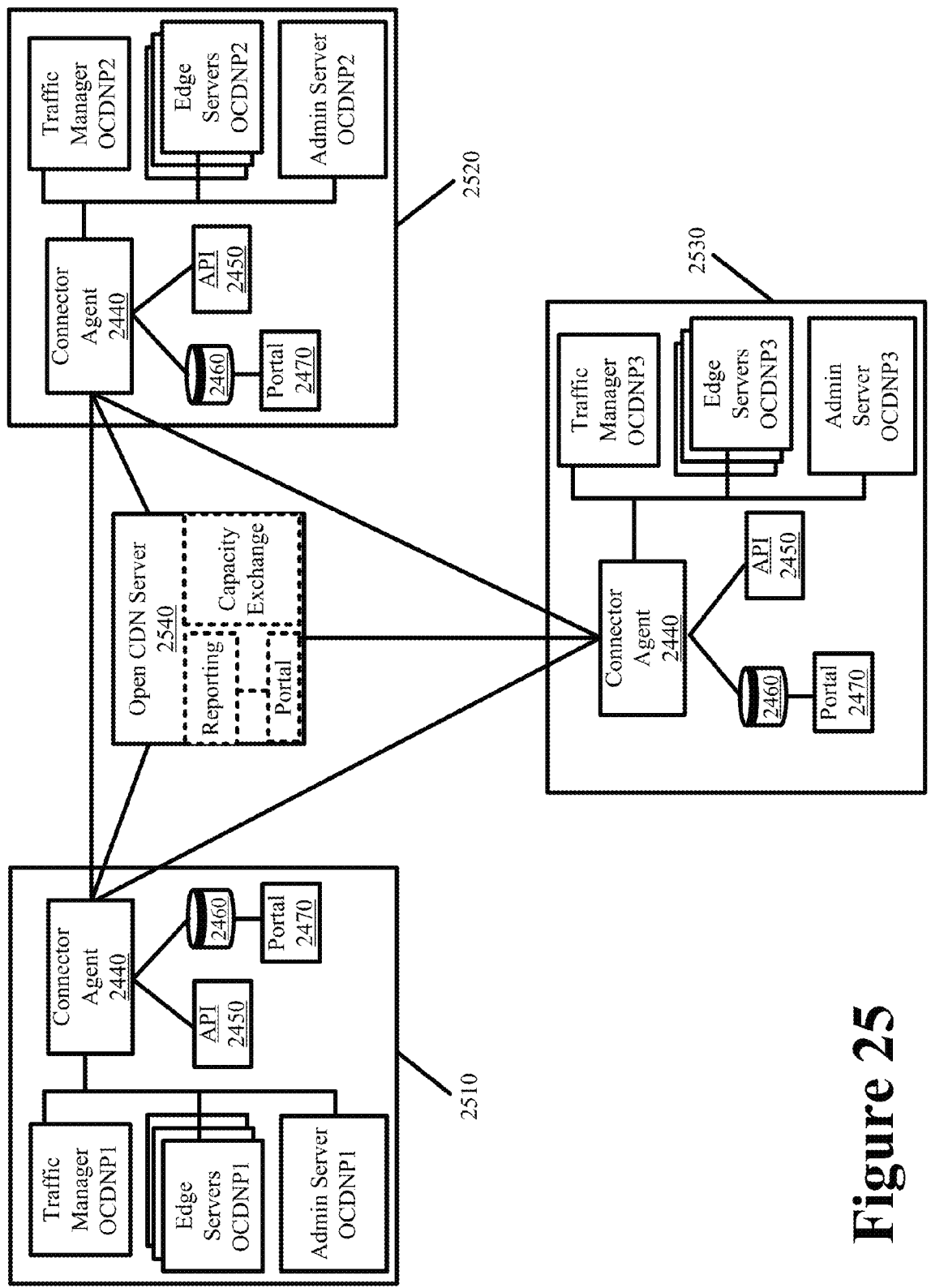
FIG. 25 presents a hybrid framework for implementing the Open CDN platform in accordance with some embodiments.

FIG. 25 presents a hybrid framework for implementing the Open CDN platform in accordance with some embodiments. In this framework, each OCDNP 2510, 2520, and 2530 is enhanced with the connector agent 2440, Open CDN API 2450, database 2460, and portal 2470 as in FIG. 24. However, the framework also includes Open CDN server 2540 that hosts the capacity exchange. Therefore, each connector agent 2440 directly communicates with the Open CDN server 2540 when intercommunications involve the buying, selling, and trading of capacity. Additionally, the Open CDN server 2540 can be used to perform the statistical data aggregation and reporting for the Open CDN platform. However, the connector agents 2440 can directly communicate with one another when passing configurations or commands for configurations deployed to foreign OCDNPs.

While FIGS. 22-25 present various centralized and decentralized frameworks with which the Open CDN platform can be implemented, the nature of the Open CDN platform allows for even more framework variations and implementations. Accordingly, it should be apparent to one of ordinary skill in the art that other frameworks may be used to implement the Open CDN platform in addition to or instead of those frameworks presented above.

As illustrated through the various frameworks above, an OCDNP can participate in the Open CDN platform with minimal change to its existing infrastructure and configuration. In fact, each OCDNP maintains control of the definition, configuration, and allocation of its own infrastructure even when participating in the Open CDN platform. Each OCDNP controls what portions of its CDN are exposed and assimilated into the Open CDN platform for use by others. Accordingly, each OCDNP can operate a large portion of its CDN privately while exposing only a small subset the CDN to the Open CDN platform. The exposed portions can be mapped in arbitrary ways to create different logical allocations on top of actual physical infrastructure. Each OCDNP can dynamically add, remove, or modify its own infrastructure. Traffic management and capacity allocations will adjust with the current state of the OCDNP infrastructure allocation. Accordingly, OCDNPs can participate in the Open CDN platform while continuing to operate a majority of their CDN independent of the Open CDN platform. OCDNPs can retain their own set of customers and participate in the Open CDN platform to sell unused capacity or purchase additional capacity. Customers need not be aware that their configurations are deployed across one or more CDNs.

In some embodiments, the Open CDN platform can open the capacity exchange directly to customers. This allows the Open CDN platform to become its own OCDNP. In some such embodiments, customers that are content originators can access the interface portal of the Open CDN platform to directly purchase capacity that meets their requirements irrespective of who the underlying OCDNPs for that capacity are. A configuration is then uploaded using the interface portal and automatically deployed to the acquired resources.

Some benefits of this service provider model include offloading customer management from the OCDNPs to the Open CDN platform. Also, the capacity exchange allows customers the ability to instantly price compare the service instances of multiple OCDNPs in order to select the service instance that best meets their needs. It is also recognized that some OCDNP's will choose to deploy CDN technology for infrastructure augmentation and cost optimization purposes and not wish to directly establish the commercial processes, staff, and practices of selling CDN services as an OCDNP to content publishers directly, instead choosing to leverage the existence of the Open CDN platform as a channel for driving traffic onto their CDN infrastructure thereby monetizing their infrastructure investment through $3^{rd}$ party commercial services.

V. Server System

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine is meant in its broadest sense, and can include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Furthermore, almost everywhere that a server is identified as a component of the embodied invention, it is understood that the server may be a single physical machine, or a cluster of multiple physical machines performing related functions, or virtualized servers co-resident on a single physical machine, or various combinations of the above.

Figure 26:
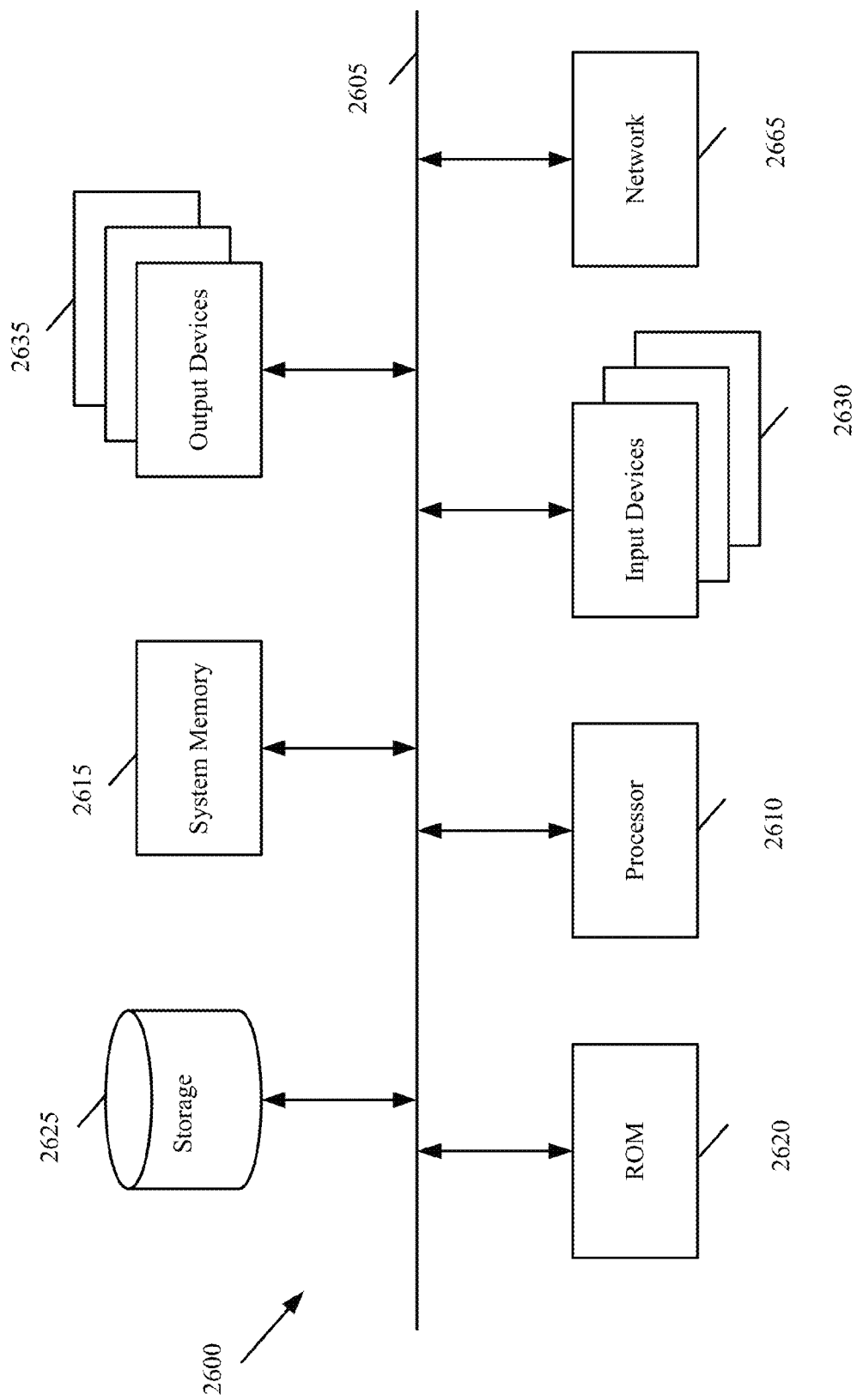
FIG. 26 illustrates a computer system or server with which some embodiments are implemented.

FIG. 26 illustrates a computer system or server with which some embodiments are implemented. Such a computer system includes various types of computer readable mediums and interfaces for various other types of computer readable mediums that implement the various processes and modules described above (e.g., exchange server, Open CDN API, database, and interface portal). Computer system 2600 includes a bus 2605, a processor 2610, a system memory 2615, a read-only memory 2620, a permanent storage device 2625, input devices 2630, and output devices 2635.

The bus 2605 collectively represents all system, peripheral, and chipset buses that communicatively connect the numerous internal devices of the computer system 2600. For instance, the bus 2605 communicatively connects the processor 2610 with the read-only memory 2620, the system memory 2615, and the permanent storage device 2625. From these various memory units, the processor 2610 retrieves instructions to execute and data to process in order to execute the processes of the invention. The processor 2610 is a processing device such as a central processing unit, integrated circuit, graphical processing unit, etc.

The read-only-memory (ROM) 2620 stores static data and instructions that are needed by the processor 2610 and other modules of the computer system. The permanent storage device 2625, on the other hand, is a read-and-write memory device. This device is a non-volatile memory unit that stores instructions and data even when the computer system 2600 is off. Some embodiments of the invention use a mass-storage device (such as a magnetic or optical disk and its corresponding disk drive) as the permanent storage device 2625.

Other embodiments use a removable storage device (such as a flash drive) as the permanent storage device Like the permanent storage device 2625, the system memory 2615 is a read-and-write memory device. However, unlike storage device 2625, the system memory is a volatile read-and-write memory, such a random access memory (RAM). The system memory stores some of the instructions and data that the processor needs at runtime. In some embodiments, the processes are stored in the system memory 2615, the permanent storage device 2625, and/or the read-only memory 2620.

The bus 2605 also connects to the input and output devices 2630 and 2635. The input devices enable the user to communicate information and select commands to the computer system. The input devices 2630 include alphanumeric keypads (including physical keyboards and touchscreen keyboards), pointing devices (also called "cursor control devices"). The input devices 2630 also include audio input devices (e.g., microphones, MIDI musical instruments, etc.). The output devices 2635 display images generated by the computer system. The output devices include printers and display devices, such as cathode ray tubes (CRT) or liquid crystal displays (LCD).

Finally, as shown in FIG. 26, bus 2605 also couples computer 2600 to a network 2665 through a network adapter (not shown). In this manner, the computer can be a part of a network of computers (such as a local area network ("LAN"), a wide area network ("WAN"), or an Intranet, or a network of networks, such as the internet. For example, the computer 2600 may be communicably coupled through the network 2665 to an ingest server, mid-tier server, edge server, content provider streaming server, or end user device.

As mentioned above, the computer system 2600 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A log reporting system for a federation, the log reporting system comprising:
at least one machine having a processor and non-transitory computer-readable medium, the non-transitory computer-readable medium storing at least one program that configures the processor in performing operations comprising:
receiving a first set of native customer identifiers a first content delivery network (CDN) uses in identifying customers of the first CDN and a second set of native customer identifiers a different second CDN uses in identifying customers of the second CDN, wherein the first CDN and the second CDN are two of a plurality of CDNs participating in the federation, wherein the first CDN customers and the second CDN customers collectively form a plurality of federation customers, and wherein the native customer identifiers used by the first CDN in identifying first CDN customers are inconsistent with the native customer identifiers used by the second CDN in identifying the second CDN customers;
establishing a first secure network connection between said machine and the first CDN and a second secure network connection between said machine and the second CDN;
aggregating server logs from a first set of servers operated by the first CDN at a first plurality of geographic locations and a different second set of servers the second CDN operates independent of the first CDN at a different second plurality of geographic locations over the first and second secure connections, wherein the first set of servers operated by the first CDN are not part of or communicably coupled to the second set of servers operated by the second CDN and the second set of servers are not part of or communicably coupled to the first set of servers, wherein each server log comprises (i) transactional entries identifying metrics related to content any one CDN server distributes on behalf of at least one customer of the plurality of federation customers and (ii) native customer identifiers from the first and second sets of native customer identifiers identifying a customer associated with each transactional entry;
producing a plurality of customer logs from the transactional entries of said server logs, wherein producing each customer log comprises converting the first and second sets of native customer identifiers from the server logs to common federation customer identifiers and identifying from the common federation customer identifiers, at least two transactional entries from at least two different server logs of servers operated by the first and second CDNs with the at least two transactional entries identifying metrics related to distributed content of one common customer of the plurality of federation customers; and
providing an interface to access the plurality of customer logs.

2. The log reporting system of claim 1, wherein said program further configures the processor in performing operations comprising archiving the plurality of customer logs to the non-transitory computer-readable medium, and wherein said interface provides access to the plurality of customer logs archived to the non-transitory computer-readable medium.

3. The log reporting system of claim 1, wherein said interface provides the plurality of CDNs access to the plurality of customer logs.

4. The log reporting system of claim 1, wherein said interface provides any of the plurality of federation customers access to the plurality of customer logs.

5. The log reporting system of claim 1, wherein said program further configures the processor in performing operations comprising automatically disseminating a customer log to a corresponding customer using at least one of email and a file transfer protocol.

6. The log reporting system of claim 1, wherein said program further configures the processor in performing operations comprising producing a performance report based on a customer log for a customer of the plurality of federation customers, wherein said performance report is derived from a transactional entry performed by a server operated by the first CDN and a transactional entry performed by a server operated by the second CDN.

7. The log reporting system of claim 1, wherein said program further configures the processor in performing operations comprising producing a first set of customer logs for customers of the first CDN based on transactional entries identifying metrics related to distribution of content for customers of the first CDN and producing a second set of customer logs for customers of the second CDN based on server log transactional entries identifying metrics related to distribution of content for customers of the second CDN.

8. A federation comprising:
a first content delivery network (CDN) operating a first set of servers at a first plurality of geographic locations, each server of the first set of servers comprising a processor and memory configured to cache and distribute first CDN customer content, the first CDN identifying first CDN customers with a first set of native customer identifiers;
a second CDN operating a second set of servers independent of the first set of servers of the first CDN at a different second plurality of geographic locations, each server of the second set of servers comprising a processor and memory configured to cache and distribute second CDN customer content, the second CDN identifying second CDN customers with a second set of native customer identifiers that are inconsistent with the first set of native customer identifiers of the first CDN, wherein the second CDN requests an amount of capacity from the first set of servers and maps a particular customer configuration from a proprietary second CDN configuration format to a proprietary first CDN configuration, and wherein the first CDN allocates the amount of capacity from the first set of servers in response to said request and configures the amount of capacity according to the particular customer configuration mapped to the proprietary first CDN configuration format; and a log reporting system comprising at least one machine with a processor coupled to memory for:
(i) establishing a first secure network connection between said machine and the first CDN and a second secure network connection between said machine and the second CDN,
(ii) aggregating server logs produced by the first and second sets of servers using said first secure network connection and the second secure network connection, wherein each server log comprises transactional entries identifying metrics related to content that a particular server of the first and second sets of servers distributes on behalf of at least one customer of a plurality of customers and native customer identifiers from any of the first or second sets of native customer identifiers identifying a customer associated with each transactional entry,
(iii) for each particular customer of the plurality of customers, producing a customer log based on transactional entries from the aggregated server logs, wherein producing the customer log comprises converting the native customer identifiers associated with the transactional entries from the aggregated server logs to common federation customer identifiers and identifying from the common federation customer identifiers, transactional entries from a first aggregated server log that is produced by a server operated by the first CDN and a second aggregated server log that is produced by a server operated by the second CDN independent of the first CDN with the transactional entries identifying metrics related to distribution of the particular customer's content, and
(iv) providing access to the plurality of customer logs.

9. The federation of claim 8, wherein the log reporting system comprises a first log reporting system that is associated with the first CDN and a second log reporting system that is associated with the second CDN.

10. The federation of claim 9, wherein the first log reporting system is further for passing transactional entries for customers of the second CDN to the second log reporting system for the second log reporting system to produce a set of customer logs for customers of the second CDN, and wherein the second log reporting system is further for passing transactional entries for customers of the first CDN to the first log reporting system for the first log reporting system to produce a set of customer logs for customers of the first CDN.

11. The federation of claim 10, wherein the first log reporting system is for providing customers of the first CDN access to customer logs for customers of the first CDN and the second log reporting system is for providing customers of the second CDN access to customer logs for customers of the second CDN.

12. The federation of claim 8, wherein the log reporting system comprises a portal for providing customers of the first CDN and the second CDN access to at least one customer log of the plurality of customer logs.

13. The federation of claim 8, wherein the log reporting system comprises an agent for passing customer logs for customers of the first CDN to the first CDN for access through a portal operated by the first CDN and for passing customer logs for customers of the second CDN to the second CDN for access through a portal operated by the second CDN.

14. The federation of claim 8, wherein the log reporting system comprises a storage for storing customer logs for customers of the first CDN and the second CDN.

15. A method for providing log reporting in a federation of a plurality of federated content delivery networks (CDNs) engaged in the sharing of server capacity, the method comprising:
with at least one machine of the federation having a processor and non-transitory computer-readable medium storing at least one program that configures the processor in performing operations comprising:
aggregating server logs from each CDN of the plurality of federated CDNs, wherein each CDN of the plurality of federated CDNs independently operates and deploys a different subset of servers to a different plurality of geographic locations, wherein each CDN optimizes distribution of content from each of the geographic locations of the CDN on behalf of a different set of CDN customers, wherein at least a first CDN of the plurality of the federated CDNs acquires capacity from a different independently operated second CDN of the plurality of the federated CDNs for simultaneous distribution of the same customer content from each of the different plurality of geographic locations of the first CDN and the second CDN, and wherein each server log comprises transactional entries identifying metrics related to content that a particular server distributes on behalf of at least one customer of a plurality of federation customers that is registered with any of the plurality of federated CDNs;
processing said server logs to produce a plurality of customer logs, wherein a particular customer log of the plurality of customer logs comprises at least two transactional entries from at least two different server logs of servers operated by the first and second CDNs with the at least two transactional entries identifying metrics related to distribution of the same customer content for a particular customer of the plurality of federation customers;
detecting from the transactional entries of the particular customer log of the plurality of customer logs, a first amount of resource usage from servers of the first CDN and a second amount of resource usage from servers of the second CDN; and
billing a customer associated with the particular customer log a first fee for the first amount of resource usage from the first CDN and a different second fee for the second amount of resource usage from the second CDN based on different resource usages fees assessed by the first CDN and the second CDN.

16. The method of claim 15 further comprising producing a performance report based on the particular customer log for the particular customer, and providing the performance report to at least the first CDN and the second CDN.

17. The method of claim 15, wherein a server log that is aggregated from a server operated by the first CDN comprises transactional entries performed by said server for a customer of the second CDN.

18. The method of claim 17, wherein the particular customer log comprises transactional entries performed by a first server that is operated by the first CDN and a second server that is operated by the second CDN.

19. The method of claim 15 further comprising communicably coupling to the servers of the plurality of federated CDNs, and wherein aggregating the server logs comprises aggregating the server logs from the servers of the plurality of federated CDNs.

20. The method of claim 15 further comprising communicably coupling to native log reporting systems of the plurality of federated CDNs, and wherein aggregating the server logs comprises aggregating the server logs from native log reporting systems of the plurality of federated CDNs.

21. The method of claim 15 further comprising providing a portal for customers of the plurality of federated CDNs to interface and submit requests for customer logs, and wherein providing each customer log comprises providing a requested customer log to a customer through said portal.

22. The log reporting system of claim 1, wherein said program further configures the processor in performing operations comprising billing a particular customer of the plurality of federation customers according to the at least two transactional entries from a customer log that is produced for that particular customer.

23. The log reporting system of claim 1, wherein said program further configures the processor in performing operations comprising generating a performance report for a particular customer based on the at least two transactional entries from a customer log that is produced for that particular customer, the performance report identifying content delivery performance resulting from distribution of the particular customer content from the first set of servers of the first CDN and the second set of servers of the second CDN.

\* \* \* \* \*